(12) United States Patent
Lavian et al.

(10) Patent No.: US 8,548,135 B1
(45) Date of Patent: Oct. 1, 2013

(54) SYSTEMS AND METHODS FOR VISUAL PRESENTATION AND SELECTION OF IVR MENU

(76) Inventors: Tal Lavian, Sunnyvale, CA (US); Zvi Or-Bach, San Jose, CA (US)

( * ) Notice: Subject to any disclaimer, the term of this patent is extended or adjusted under 35 U.S.C. 154(b) by 333 days.

(21) Appl. No.: 13/022,869

(22) Filed: Feb. 8, 2011

Related U.S. Application Data

(63) Continuation-in-part of application No. 12/699,618, filed on Feb. 3, 2010.

(51) Int. Cl.
*H04M 11/00* (2006.01)
(52) U.S. Cl.
USPC .............. 379/93.25; 379/93.17; 379/142.06
(58) Field of Classification Search
USPC .............. 379/93.17, 93.23, 142.06, 142.15, 379/142.16
See application file for complete search history.

(56) References Cited

U.S. PATENT DOCUMENTS

| | | |
|---|---|---|
| 4,653,045 A | 3/1987 | Stanley et al. |
| 4,736,405 A | 4/1988 | Akiyama |
| 4,897,866 A | 1/1990 | Majmudar et al. |
| 5,006,987 A | 4/1991 | Harles |
| 5,007,429 A | 4/1991 | Treatch et al. |
| 5,027,400 A | 6/1991 | Baji et al. |
| 5,086,385 A | 2/1992 | Launey et al. |
| 5,144,548 A | 9/1992 | Salandro |
| 5,265,014 A | 11/1993 | Haddock et al. |
| 5,294,229 A | 3/1994 | Hartzell et al. |
| 5,335,276 A | 8/1994 | Thompson et al. |
| 5,416,831 A | 5/1995 | Chewning, III et al. |
| 5,417,575 A | 5/1995 | McTaggart |
| 5,422,809 A | 6/1995 | Griffin et al. |
| 5,465,213 A | 11/1995 | Ross |
| 5,465,401 A | 11/1995 | Thompson |
| 5,475,399 A | 12/1995 | Borsuk |
| 5,499,330 A | 3/1996 | Lucas et al. |
| 5,519,809 A | 5/1996 | Husseiny et al. |
| 5,533,102 A | 7/1996 | Robinson et al. |
| 5,550,746 A | 8/1996 | Jacobs |
| 5,572,581 A | 11/1996 | Sattar et al. |
| 5,585,858 A | 12/1996 | Harper et al. |
| 5,586,235 A | 12/1996 | Kauffman |
| 5,588,044 A | 12/1996 | Lofgren et al. |

(Continued)

FOREIGN PATENT DOCUMENTS

| | | |
|---|---|---|
| EP | 1225754 A3 | 7/2003 |
| EP | 1001597 A3 | 9/2003 |

(Continued)

OTHER PUBLICATIONS

Yin, M. and Zhai, S., "The Benefits of Augmenting Telephone Voice Menu Navigation with Visual Browsing and Search," CHI'06 Proceedings of the SIGCHI conference on Human Factors in computing systems: pp. 319-328, ACM, Montreal, Canada (Apr. 2006).

(Continued)

*Primary Examiner* — Stella Woo

(57) ABSTRACT

Embodiments of the invention provide a communication device. The communication device comprises a database comprising one or more visual IVR menus associated with a plurality of calling devices. Further, the communication device comprises means for receiving a call from a phone number of a calling device, and means for displaying a visual IVR menu associated with the phone number of the calling device.

18 Claims, 10 Drawing Sheets

(56) References Cited

U.S. PATENT DOCUMENTS

| | | | |
|---|---|---|---|
| 5,592,538 | A | 1/1997 | Kosowsky et al. |
| 5,606,361 | A | 2/1997 | Davidsohn et al. |
| 5,633,909 | A | 5/1997 | Fitch |
| 5,633,916 | A | 5/1997 | Goldhagen et al. |
| 5,657,221 | A | 8/1997 | Warman et al. |
| 5,689,648 | A | 11/1997 | Diaz et al. |
| 5,724,412 | A | 3/1998 | Srinivasan |
| 5,739,814 | A | 4/1998 | Ohara et al. |
| 5,740,549 | A | 4/1998 | Reilly et al. |
| 5,768,142 | A | 6/1998 | Jacobs |
| 5,790,652 | A | 8/1998 | Gulley et al. |
| 5,794,205 | A | 8/1998 | Walters et al. |
| 5,796,806 | A | 8/1998 | Birckbichler |
| 5,802,283 | A | 9/1998 | Grady et al. |
| 5,802,526 | A | 9/1998 | Fawcett et al. |
| 5,807,336 | A | 9/1998 | Russo et al. |
| 5,819,225 | A | 10/1998 | Eastwood et al. |
| 5,822,404 | A | 10/1998 | Cave |
| 5,822,405 | A | 10/1998 | Astarabadi |
| 5,838,682 | A | 11/1998 | Dekelbaum et al. |
| 5,838,775 | A | 11/1998 | Montalbano |
| 5,867,816 | A | 2/1999 | Nussbaum |
| 5,873,068 | A | 2/1999 | Beaumont et al. |
| 5,885,083 | A | 3/1999 | Ferrell |
| 5,885,245 | A | 3/1999 | Lynch et al. |
| 5,890,123 | A | 3/1999 | Brown et al. |
| 5,892,813 | A | 4/1999 | Morin et al. |
| 5,907,793 | A | 5/1999 | Reams |
| 5,912,952 | A | 6/1999 | Brendzel |
| 5,913,195 | A | 6/1999 | Weeren et al. |
| 5,920,477 | A | 7/1999 | Hoffberg et al. |
| 5,937,040 | A | 8/1999 | Wrede et al. |
| 5,940,488 | A | 8/1999 | DeGrazia et al. |
| 5,948,040 | A | 9/1999 | DeLorme et al. |
| 5,956,034 | A | 9/1999 | Sachs et al. |
| 5,982,875 | A | 11/1999 | Lieben et al. |
| 5,987,103 | A | 11/1999 | Martino |
| 6,009,398 | A | 12/1999 | Mueller et al. |
| 6,014,428 | A | 1/2000 | Wolf |
| 6,020,915 | A | 2/2000 | Bruno et al. |
| 6,049,779 | A | 4/2000 | Berkson |
| 6,055,513 | A | 4/2000 | Katz et al. |
| 6,062,863 | A | 5/2000 | Kirksey et al. |
| 6,088,429 | A | 7/2000 | Garcia |
| 6,088,712 | A | 7/2000 | Huang et al. |
| 6,091,805 | A | 7/2000 | Watson |
| 6,091,956 | A | 7/2000 | Hollenberg |
| 6,104,790 | A | 8/2000 | Narayanaswami |
| 6,144,848 | A | 11/2000 | Walsh et al. |
| 6,148,065 | A | 11/2000 | Katz |
| 6,169,734 | B1 | 1/2001 | Wilson |
| 6,212,547 | B1 | 4/2001 | Ludwig et al. |
| 6,228,921 | B1 | 5/2001 | Kasemann et al. |
| 6,229,694 | B1 | 5/2001 | Kono |
| 6,230,197 | B1 | 5/2001 | Beck et al. |
| 6,259,444 | B1 | 7/2001 | Palmer et al. |
| 6,263,064 | B1 | 7/2001 | O'Neal et al. |
| 6,273,726 | B1 | 8/2001 | Kirksey et al. |
| 6,285,364 | B1 * | 9/2001 | Giordano et al. ............. 715/804 |
| 6,321,198 | B1 | 11/2001 | Hank et al. |
| 6,335,678 | B1 | 1/2002 | Heutschi |
| 6,366,650 | B1 | 4/2002 | Rhie et al. |
| 6,373,817 | B1 | 4/2002 | Kung et al. |
| 6,400,807 | B1 | 6/2002 | Hewitt et al. |
| 6,405,033 | B1 | 6/2002 | Kennedy, III et al. |
| 6,408,301 | B1 | 6/2002 | Patton et al. |
| 6,427,063 | B1 | 7/2002 | Cook et al. |
| 6,445,694 | B1 | 9/2002 | Swartz |
| 6,449,595 | B1 | 9/2002 | Arslan et al. |
| 6,456,706 | B1 | 9/2002 | Blood et al. |
| 6,460,057 | B1 | 10/2002 | Butler et al. |
| 6,463,145 | B1 | 10/2002 | O'Neal et al. |
| 6,482,156 | B2 | 11/2002 | Iliff |
| 6,505,146 | B1 | 1/2003 | Blackmer |
| 6,510,411 | B1 | 1/2003 | Norton et al. |
| 6,529,500 | B1 | 3/2003 | Pandharipande |
| 6,560,320 | B1 | 5/2003 | Paleiov et al. |
| 6,603,840 | B2 | 8/2003 | Fellingham et al. |
| 6,606,611 | B1 | 8/2003 | Khan |
| 6,606,741 | B2 | 8/2003 | Kojima et al. |
| 6,636,835 | B2 | 10/2003 | Ragsdale et al. |
| 6,653,930 | B1 | 11/2003 | Bonomo et al. |
| 6,658,389 | B1 | 12/2003 | Alpdemir |
| 6,705,869 | B2 | 3/2004 | Schwartz |
| 6,714,519 | B2 | 3/2004 | Luzzatti et al. |
| 6,731,625 | B1 | 5/2004 | Eastep et al. |
| 6,754,181 | B1 | 6/2004 | Elliott et al. |
| 6,788,770 | B1 | 9/2004 | Cook et al. |
| 6,791,583 | B2 | 9/2004 | Tang et al. |
| 6,816,580 | B2 | 11/2004 | Timmins |
| 6,820,037 | B2 | 11/2004 | Simon |
| 6,820,062 | B1 | 11/2004 | Gupta et al. |
| 6,826,194 | B1 | 11/2004 | Vered et al. |
| 6,829,368 | B2 | 12/2004 | Meyer et al. |
| 6,856,673 | B1 | 2/2005 | Banks et al. |
| 6,862,713 | B1 | 3/2005 | Kraft et al. |
| 6,865,268 | B1 | 3/2005 | Matthews et al. |
| 6,885,737 | B1 | 4/2005 | Gao et al. |
| 6,889,195 | B2 | 5/2005 | Strandberg |
| 6,920,205 | B2 | 7/2005 | Hahn et al. |
| 6,920,425 | B1 | 7/2005 | Will et al. |
| 6,920,431 | B2 | 7/2005 | Showghi et al. |
| 6,937,705 | B1 | 8/2005 | Godfrey et al. |
| 6,968,506 | B2 | 11/2005 | Yacovone et al. |
| 6,990,455 | B2 | 1/2006 | Vozick |
| 7,006,612 | B1 | 2/2006 | Stroud et al. |
| 7,020,609 | B2 | 3/2006 | Thrift et al. |
| 7,027,990 | B2 | 4/2006 | Sussman |
| 7,036,128 | B1 | 4/2006 | Julia et al. |
| 7,039,589 | B2 | 5/2006 | Whitham |
| 7,047,196 | B2 | 5/2006 | Calderone et al. |
| 7,065,188 | B1 | 6/2006 | Mei et al. |
| 7,068,643 | B1 | 6/2006 | Hammond |
| 7,092,738 | B2 | 8/2006 | Creamer et al. |
| 7,100,118 | B1 | 8/2006 | Klask |
| 7,130,391 | B2 | 10/2006 | Janakiraman et al. |
| 7,136,480 | B2 | 11/2006 | Mason |
| 7,139,591 | B2 | 11/2006 | Callaghan et al. |
| 7,145,902 | B2 | 12/2006 | Schindler et al. |
| 7,146,321 | B2 | 12/2006 | Cyr et al. |
| 7,149,549 | B1 | 12/2006 | Ortiz et al. |
| 7,159,008 | B1 | 1/2007 | Wies et al. |
| 7,177,814 | B2 | 2/2007 | Gong et al. |
| 7,180,889 | B1 | 2/2007 | Kung et al. |
| 7,180,985 | B2 | 2/2007 | Colson et al. |
| 7,181,401 | B2 | 2/2007 | Johnson et al. |
| 7,181,502 | B2 | 2/2007 | Incertis |
| 7,188,352 | B2 | 3/2007 | Nathan et al. |
| 7,203,517 | B2 | 4/2007 | Shimoda et al. |
| 7,206,745 | B2 | 4/2007 | Surukkai et al. |
| 7,206,809 | B2 | 4/2007 | Ludwig et al. |
| 7,209,124 | B2 | 4/2007 | Hunt et al. |
| 7,213,061 | B1 | 5/2007 | Hite et al |
| 7,215,743 | B2 | 5/2007 | Creamer et al. |
| 7,216,348 | B1 | 5/2007 | deCarmo |
| 7,225,409 | B1 | 5/2007 | Schnarel et al. |
| 7,225,455 | B2 | 5/2007 | Bennington et al. |
| 7,228,492 | B1 | 6/2007 | Graham |
| 7,231,636 | B1 | 6/2007 | Evans |
| 7,231,656 | B1 | 6/2007 | Nathan |
| 7,240,006 | B1 | 7/2007 | Brocious et al. |
| 7,240,289 | B2 | 7/2007 | Naughton et al. |
| 7,246,063 | B2 | 7/2007 | James et al. |
| 7,248,885 | B2 | 7/2007 | Benco et al. |
| 7,250,939 | B2 | 7/2007 | Lira |
| 7,254,227 | B2 | 8/2007 | Mumick et al. |
| 7,265,861 | B2 | 9/2007 | Ranalli et al. |
| 7,266,185 | B2 | 9/2007 | Trandal et al. |
| 7,266,186 | B1 | 9/2007 | Henderson |
| 7,266,499 | B2 | 9/2007 | Surace et al. |
| 7,272,222 | B2 | 9/2007 | Joseph et al. |
| 7,272,497 | B2 | 9/2007 | Koshiji et al. |
| 7,277,854 | B2 | 10/2007 | Bennett et al. |
| 7,280,097 | B2 | 10/2007 | Chen et al. |

| | | | |
|---|---|---|---|
| 7,280,646 B2 | 10/2007 | Urban et al. | |
| 7,280,651 B2 | 10/2007 | Anderson | |
| 7,286,990 B1 | 10/2007 | Edmonds et al. | |
| 7,289,608 B2 | 10/2007 | Kumhyr | |
| 7,289,904 B2 | 10/2007 | Uyeki | |
| 7,299,405 B1 | 11/2007 | Lee et al. | |
| 7,303,121 B2 | 12/2007 | Martinez | |
| 7,319,477 B2 | 1/2008 | Katz | |
| 7,324,947 B2 | 1/2008 | Jordan et al. | |
| 7,328,239 B1 | 2/2008 | Berberian et al. | |
| 7,330,890 B1 | 2/2008 | Partovi et al. | |
| 7,353,016 B2 | 4/2008 | Roundtree et al. | |
| 7,392,193 B2 | 6/2008 | Mault | |
| 7,398,215 B2 | 7/2008 | Mesbah et al. | |
| 7,406,413 B2 | 7/2008 | Geppert et al. | |
| 7,412,533 B1 | 8/2008 | Johnson et al. | |
| 7,433,452 B2 | 10/2008 | Taylor et al. | |
| 7,440,898 B1 | 10/2008 | Eberle et al. | |
| 7,450,112 B2 | 11/2008 | Shneidman | |
| 7,466,803 B2 | 12/2008 | Burg et al. | |
| 7,492,883 B2 | 2/2009 | Kumhyr | |
| 7,539,484 B2 | 5/2009 | Roundtree | |
| 7,546,143 B2 | 6/2009 | Nelson et al. | |
| 7,584,249 B2 | 9/2009 | Mummick et al. | |
| 7,606,741 B2 | 10/2009 | King et al. | |
| 7,646,858 B2 | 1/2010 | Salafia et al. | |
| 7,693,720 B2 | 4/2010 | Kennewick et al. | |
| 7,720,091 B2 | 5/2010 | Faber et al. | |
| 7,729,490 B2 | 6/2010 | Hemm et al. | |
| 7,757,173 B2 | 7/2010 | Beaman | |
| 7,809,376 B2 | 10/2010 | Letourneau et al. | |
| 7,813,485 B2 | 10/2010 | Yin et al. | |
| 7,843,899 B2 | 11/2010 | Burritt | |
| 7,864,944 B2 | 1/2011 | Khouri et al. | |
| 7,908,381 B2 | 3/2011 | Koch et al. | |
| 7,966,188 B2 | 6/2011 | Ativanichayaphong et al. | |
| 8,000,454 B1 | 8/2011 | Or-Bach et al. | |
| 8,023,624 B2 | 9/2011 | Kargman et al. | |
| 8,054,952 B1 | 11/2011 | Or-Bach et al. | |
| 8,155,280 B1 | 4/2012 | Or-Bach et al. | |
| 8,160,215 B2 | 4/2012 | Or-Bach et al. | |
| 8,374,319 B1 * | 2/2013 | Bridges et al. | 379/88.22 |
| 2002/0055844 A1 | 5/2002 | L'Esperance et al. | |
| 2002/0147986 A1 | 10/2002 | Michael et al. | |
| 2003/0005126 A1 | 1/2003 | Schwartz et al. | |
| 2003/0007625 A1 | 1/2003 | Pines et al. | |
| 2003/0033382 A1 | 2/2003 | Bogolea et al. | |
| 2003/0074198 A1 | 4/2003 | Sussman | |
| 2003/0112931 A1 | 6/2003 | Brown et al. | |
| 2004/0034561 A1 | 2/2004 | Smith | |
| 2004/0122941 A1 | 6/2004 | Creamer et al. | |
| 2004/0198316 A1 | 10/2004 | Johnson | |
| 2004/0204116 A1 | 10/2004 | Ben Efraim et al. | |
| 2005/0004977 A1 | 1/2005 | Roberts et al. | |
| 2005/0055310 A1 | 3/2005 | Drewett et al. | |
| 2006/0148459 A1 | 7/2006 | Wolfman et al. | |
| 2006/0203977 A1 | 9/2006 | Erhart et al. | |
| 2006/0239422 A1 | 10/2006 | Rinaldo et al. | |
| 2006/0259424 A1 | 11/2006 | Turcotte et al. | |
| 2006/0262921 A1 | 11/2006 | Eppel et al. | |
| 2006/0285662 A1 | 12/2006 | Yin et al. | |
| 2007/0026852 A1 | 2/2007 | Logan et al. | |
| 2007/0032247 A1 | 2/2007 | Shaffer et al. | |
| 2007/0038513 A1 | 2/2007 | Flax et al. | |
| 2007/0094109 A1 | 4/2007 | Perry | |
| 2007/0123223 A1 | 5/2007 | Letourneau et al. | |
| 2007/0239537 A1 | 10/2007 | Protheroe et al. | |
| 2007/0243887 A1 | 10/2007 | Bandhole et al. | |
| 2007/0298776 A1 | 12/2007 | Arlene | |
| 2008/0066015 A1 | 3/2008 | Blankenhorn | |
| 2008/0095330 A1 | 4/2008 | Jin et al. | |
| 2008/0226042 A1 | 9/2008 | Singh | |
| 2008/0250334 A1 | 10/2008 | Price | |
| 2009/0041215 A1 | 2/2009 | Schmitt et al. | |
| 2009/0116414 A1 | 5/2009 | Or et al. | |
| 2009/0136014 A1 | 5/2009 | Bigue et al. | |
| 2009/0154666 A1 | 6/2009 | Rios et al. | |
| 2009/0202050 A1 | 8/2009 | Berger et al. | |
| 2009/0207980 A1 | 8/2009 | Berger et al. | |
| 2009/0207996 A1 | 8/2009 | Berger et al. | |
| 2009/0225788 A1 | 9/2009 | Kephart et al. | |
| 2009/0228908 A1 | 9/2009 | Margis et al. | |
| 2009/0276441 A1 | 11/2009 | Malik | |
| 2009/0276708 A1 | 11/2009 | Smith et al. | |
| 2009/0280863 A1 | 11/2009 | Shin et al. | |
| 2009/0285380 A1 | 11/2009 | Chen et al. | |
| 2010/0007028 A1 | 1/2010 | Fachmann et al. | |
| 2010/0021030 A1 | 1/2010 | Collins et al. | |
| 2010/0049654 A1 | 2/2010 | Pilo et al. | |
| 2010/0087175 A1 | 4/2010 | Roundtree | |
| 2010/0100377 A1 | 4/2010 | Madhavapeddi et al. | |
| 2010/0166158 A1 | 7/2010 | Costello et al. | |
| 2010/0172481 A1 | 7/2010 | Canu et al. | |
| 2010/0189250 A1 | 7/2010 | Williams et al. | |
| 2010/0191608 A1 | 7/2010 | Mikkelsen et al. | |
| 2011/0009096 A1 | 1/2011 | Rotsztein et al. | |
| 2011/0014952 A1 | 1/2011 | Minton | |
| 2011/0060683 A1 | 3/2011 | Salmon Rock et al. | |
| 2011/0091021 A1 | 4/2011 | Adkar et al. | |
| 2011/0099116 A1 | 4/2011 | Gabel | |
| 2011/0276408 A1 | 11/2011 | Toole | |
| 2012/0063574 A1 | 3/2012 | Or-Bach et al. | |

FOREIGN PATENT DOCUMENTS

| | | | |
|---|---|---|---|
| EP | 1351477 A1 | 10/2003 | |
| EP | 1120954 A3 | 6/2005 | |
| EP | 1545101 A3 | 12/2005 | |
| EP | 774853 B1 | 5/2006 | |
| EP | 1874018 A1 | 1/2008 | |
| JP | 2004274425 A | 9/2004 | |
| WO | 9819259 A1 | 5/1998 | |
| WO | 9840826 A3 | 12/1998 | |
| WO | 9856158 A3 | 3/1999 | |
| WO | 9848551 A3 | 4/1999 | |
| WO | 0131497 A1 | 5/2001 | |
| WO | 0157851 A1 | 8/2001 | |
| WO | 0165871 A1 | 9/2001 | |
| WO | 9820409 A8 | 11/2001 | |
| WO | 0217604 A1 | 2/2002 | |
| WO | 2004049306 A1 | 6/2004 | |
| WO | 2004064299 A3 | 7/2005 | |
| WO | 2007012831 A1 | 2/2007 | |
| WO | 2007081929 A3 | 1/2008 | |
| WO | 2008086320 A1 | 7/2008 | |
| WO | WO 2008/086320 A1 | 7/2008 | |
| WO | 2009006173 A3 | 3/2009 | |
| WO | 2009100477 A1 | 8/2009 | |

OTHER PUBLICATIONS

Damhuis, M., et al., "A Multimodal Consumer Information Server with IVR Menu," 2nd IEEE Workshop on Interactive Voice Technology for Telecommunications Applications (IVTTA94): pp. 73-76, Kyoto, Japan (Sep. 1994).

Shah, S.AA., et al., "Interactive Voice Response with Pattern Recognition Based on Artificial Neural Network Approach," International Conference on Emerging Technologies: pp. 249-252, (Nov. 2007).

Trihandoyo, A., et al., "A real-time speech recognition architecture for a multi-channel interactive voice response system," International Conference on Acoustics, Speech, and Signal Processing vol. 4: pp. 2687-2690,(1995).

Hattori, S., et al., "A multimedia intelligent message communication system for distributed coordination environments," Electronics & Communications in Japan, Part I—Communications, vol. 76, No. 1, pp. 11-23 (1993).

Patent abstracts of Japan, vol. 097, No. 001, Jan. 31, 1997 & JP 08 242307 A (Canon Inc), Sep. 17, 1996.

Kalva, H., et al., "Delivering Object-Based Audio-Visual Services," IEEE Transactions on Consumer Electronics, vol. 45, No. 4, pp. 1108-1111, (1999).

Schmandt, "Phoneshell: the telephone as computer terminal," Proceedings of first ACM International Conference on Multimedia, Anaheim, CA, US, pp. 373-381, (1993).

Himberg, J., et al., "Time Series Segmentation for Context Recognition in Mobile Devices", IEEE, 203-210, (2001).

Chris Schmandt and Stephen Casner, "Phonetool: Integrating Telephones and Workstations," IEEE Communication Society, Nov. 27-30, pp. 0970-0974, (1989).

Basinger, R. G., et al., "Calling Card Service—Overall Description and Operational Characteristics", The Bell System Technical Journal, (1982).

Cadiz et al. "Designing and Deploying an Information Awareness interface" CSCW'02, Nov. 2002, ACM, pp. 314-323.

Corcoran et al. disclose "User interface technologies for home appliances and networks", IEEE Trans. Consumer Elect; pp. 679-685, (1998).

Nancy Friedrich, "Graphical-User-Interface Module Eases Integration," Wireless Systems Design, Oct. 2004, 1 page.

Balachandran, R., et al., "Dialog System for Mixed Initiative One-Turn Address entry and Error Recovery," Proceedings of SIGDIAL 2009, the 10th Annual Meeting of the Special Interest Group in Discourse and Dialogue, pp. 152-155, Queen Mary University of London, Association of Computational Logistics, (2009).

Damhuis, M., et al.,"A Multimodal Consumer Information Server with IVR Menu," *2nd IEEE Workshop on Interactive Voice Technology for Telecommunications Applications (IVTTA94)*: pp. 73-76, Kyoto, Japan (Sep. 1994).

Trihandoyo, A., et al.,"A real-time speech recognition architecture for a multi-channel interactive voice response system," *International Conference on Acoustics, Speech, and Signal Processing* vol. 4: pp. 2687-2690,(1995).

Co-pending U.S. Appl. No. 12/699,618, inventors Lavian, T. and Or-Bach, Z., filed Feb. 3, 2010, entitled "Systems and methods for visual presentation and selection of IVR menu."

Co-pending U.S. Appl. No. 12/707,714, inventors Lavian, T. and Or-Bach, Z., filed Feb. 18, 2010, entitled "Systems and methods for visual presentation and selection of IVR menu."

Co-pending U.S. Appl. No. 12/719,001, inventors Lavian, T. and Or-Bach, Z., filed Mar. 7, 2010, entitled "Systems and methods for visual presentation and selection of IVR menu."

Co-pending U.S. Appl. No. 12/879,318, inventors Lavian, T. and Or-Bach, Z., filed Mar. 7, 2010, entitled "Systems and methods for visual presentation and selection of IVR menu."

Co-pending U.S. Appl. No. 12/022,883, inventors Lavian, T. and Or-Bach, Z., filed Feb. 8, 2011, entitled "Systems and methods for visual presentation and selection of IVR menu."

Co-pending U.S. Appl. No. 13/113,825, inventors Lavian, T. and Or-Bach, Z., filed May 23, 2011, entitled "Portable universal communication device."

Co-pending U.S. Appl. No. 13/022,851, inventors Lavian, T. and Or-Bach, Z., filed Feb. 8, 2011, entitled "Device and method for providing enhanced telephony."

Co-pending U.S. Appl. No. 13/022,768, inventors Lavian, T. and Or-Bach, Z., filed Feb. 8, 2011, entitled "Device and method for providing enhanced telephony."

Co-pending U.S. Appl. No. 13/022,909, inventors Lavian, T. and Or-Bach, Z., filed Feb. 8, 2011, entitled "Device and method for providing enhanced telephony."

Co-pending U.S. Appl. No. 13/046,532, inventors Lavian, T. and Or-Bach, Z., filed Mar. 11, 2011, entitled "Systems and methods for communicating with an interactive voice response system."

Co-pending U.S. Appl. No. 13/159,093, inventors Lavian, T. and Or-Bach, Z., filed Jun. 13, 2011, entitled "Systems and methods for visual presentation and selection of IVR menu."

Co-pending U.S. Appl. No. 13/185,027, inventors Lavian, T. and Or-Bach, Z., filed Jul. 18, 2011, entitled "Systems and methods for visual presentation and selection of IVR menu."

Co-pending U.S. Appl. No. 13/186,984, inventors Lavian, T. and Or-Bach, Z., filed Jul. 20, 2011, entitled "Systems and methods for visual presentation and selection of IVR menu."

\* cited by examiner

US 8,548,135 B1

SYSTEMS AND METHODS FOR VISUAL PRESENTATION AND SELECTION OF IVR MENU

CROSS REFERENCE TO RELATED APPLICATIONS

This application is a Continuation-In-Part (CIP) of U.S. Non-Provisional application Ser. No. 12/699,618 entitled 'Systems and methods for visual presentation and selection of IVR menu' and filed on Feb. 3, 2010.

FIELD OF THE INVENTION

The invention relates to Interactive Voice Response (IVR) system and more specifically the invention relates to presentation of a visual IVR menu of a calling first party device.

BACKGROUND OF THE INVENTION

The advent of Interactive Voice Response (IVR) systems has reduced operating costs for many types of businesses for providing services. Generally, the IVR systems allow a user to interact with an audio or visual response system. The IVR systems can provide prompts to a user and receive touch tone and/or spoken responses on the prompts from the user. Through such IVR dialogue the system collects sufficient information about the user to direct the call to the most appropriate resource, information processing system or the like.

In particular, the IVR Systems have allowed telephone service providers to host call centers for various businesses such as banks, insurance companies, restaurants, and other service providers. An objective of implementing the IVR systems is to provide the users or customers with a quick and good experience. Usually, the customer care executives/agents or audio IVR systems associated with the service providers call users of communication devices to offer or sell their services or products. When a user at a communication device receives a call from the agents or the audio IVR system, the user may not know the purpose of the call. Further, the user receiving the call may not know about the services provided by the calling service provider. Therefore, the user may have to listen to the calling service provider patiently and completely to know the purpose of the call and to know about their various services. Further, the desire to inquire about various other services of the service provider. This whole process may be time consuming and sometimes may be frustrating for the user.

Sometimes, it may be possible that the calling service provider does not include the information or resource desired by the user. Therefore, even after listening to the agent or audio IVR system, the user may not get the desired information. In such a case, either the user may have to wait for long time or contact some other service provider.

Some existing techniques try to address this problem by providing visual form of IVR. These techniques display the IVR menu graphically on a caller device. U.S. Pat. No. 7,215,743 assigned to International Business Machines Corporation and a published U.S. patent application with Ser. No. 11/957,605, filed Dec. 17, 2007 and assigned to Motorola Inc., provides the IVR menu of the first party device in a visual form to the caller. The caller can select the options from the IVR menu without listening to the complete audio IVR menu. However, the IVR menu displayed on the caller device is stored on an IVR server of a call receiving or service provider end. As a result, the visual IVR menu is specific to the call receiving end and only the IVR of the call receiving end is displayed. These techniques therefore, require each call receiving end to set-up hardware, software and other facilities to be deployed for providing visual IVR servers. Moreover, the visual form of audio IVR menu is displayed only when the caller dials and connects to the IVR at service provider's end.

In the light of the above discussion, techniques are desired for providing enhanced telephony.

SUMMARY

Embodiments of the present invention provide a communication device. The communication device comprises a database comprising one or more visual Interactive Voice Response (IVR) menus associated with each of a plurality of phone numbers of first party devices. Further, the communication device comprises means for receiving a call from a phone number of a first party device; and means for displaying a visual IVR menu associated with the phone number of the first party device.

Embodiments of the present invention provide a communication device. The communication device comprises a processor. Further, the communication device comprises a memory coupled to the processor. The memory comprises a database comprising one or more visual IVR menus associated with each of a plurality of phone numbers of first party devices. Further, the memory comprises instructions executable by the processor for receiving a call from a phone number of a first party device, and for displaying a visual IVR menu associated with the phone number of the first party device.

An aspect of the invention is to provide a communication device for displaying a visual IVR menu of a phone number of a first party device. The communication device receives a call from the first party device. The communication device is further configured to display one or more communication options.

Embodiments of the present invention provide a method for providing enhanced telephony. The method comprises receiving, at a communication device, a call from a phone number of a first party device. The communication device comprises one or more visual IVR menus associated with each of a plurality of phone numbers of first party devices. Further, the method comprises displaying, at the communication device, a visual IVR menu associated with the phone number of the first party device.

An aspect of the present invention is to provide a method for displaying, at a communication device, a visual IVR menu of a phone number of a calling first party device. Further, the method displays one or more communication options at the communication device.

Another aspect of the invention is to enable a user at the communication device to interact with the visual IVR menu of the calling first party device without listening to the audible IVR menu of the first party device.

Yet another aspect of the invention is to provide the visual IVR menu of a first party device to a user of a communication device before establishing a communication session between the communication device and the first party device.

BRIEF DESCRIPTION OF THE DRAWINGS

Figure 1A:
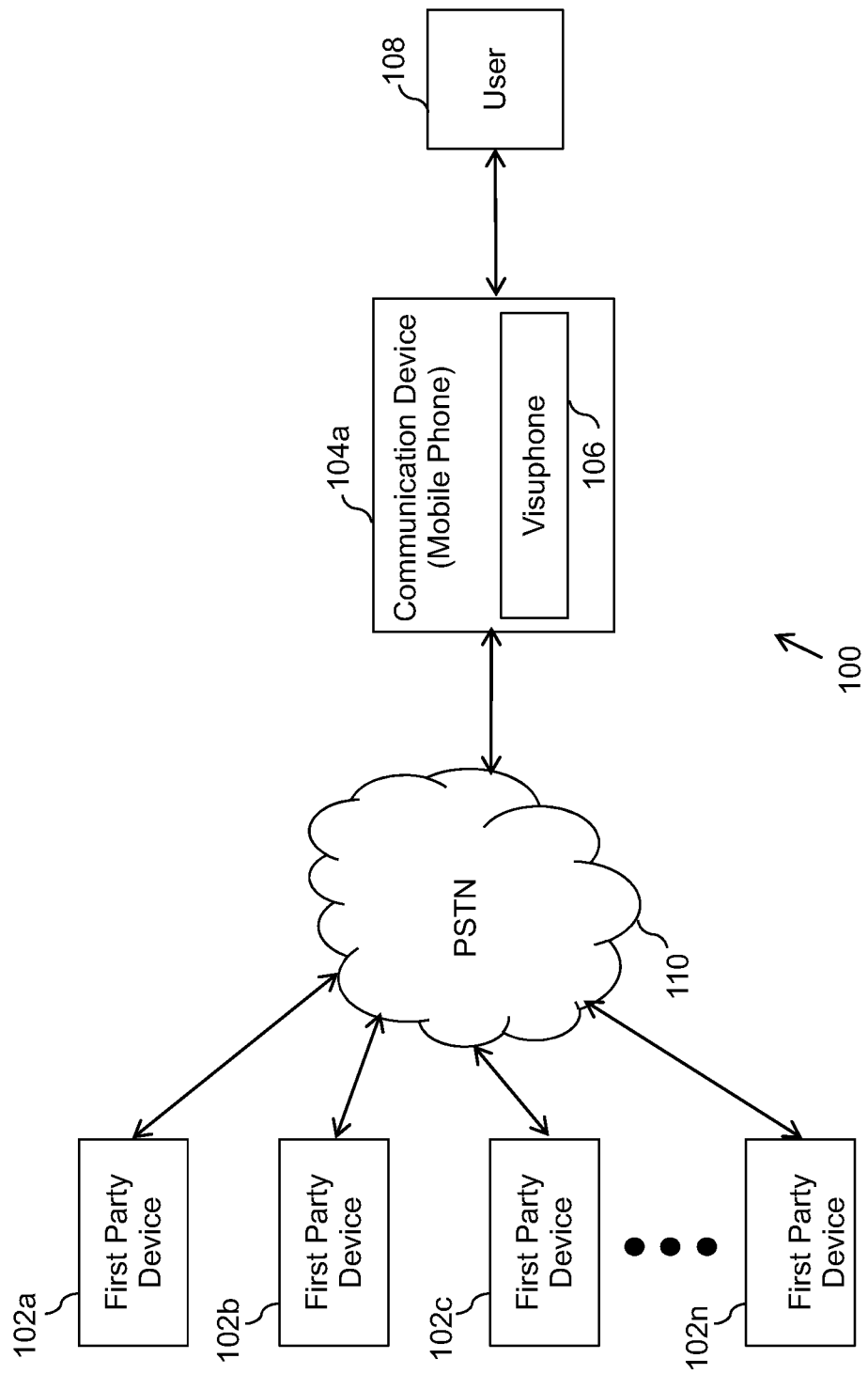
Figure 1B:
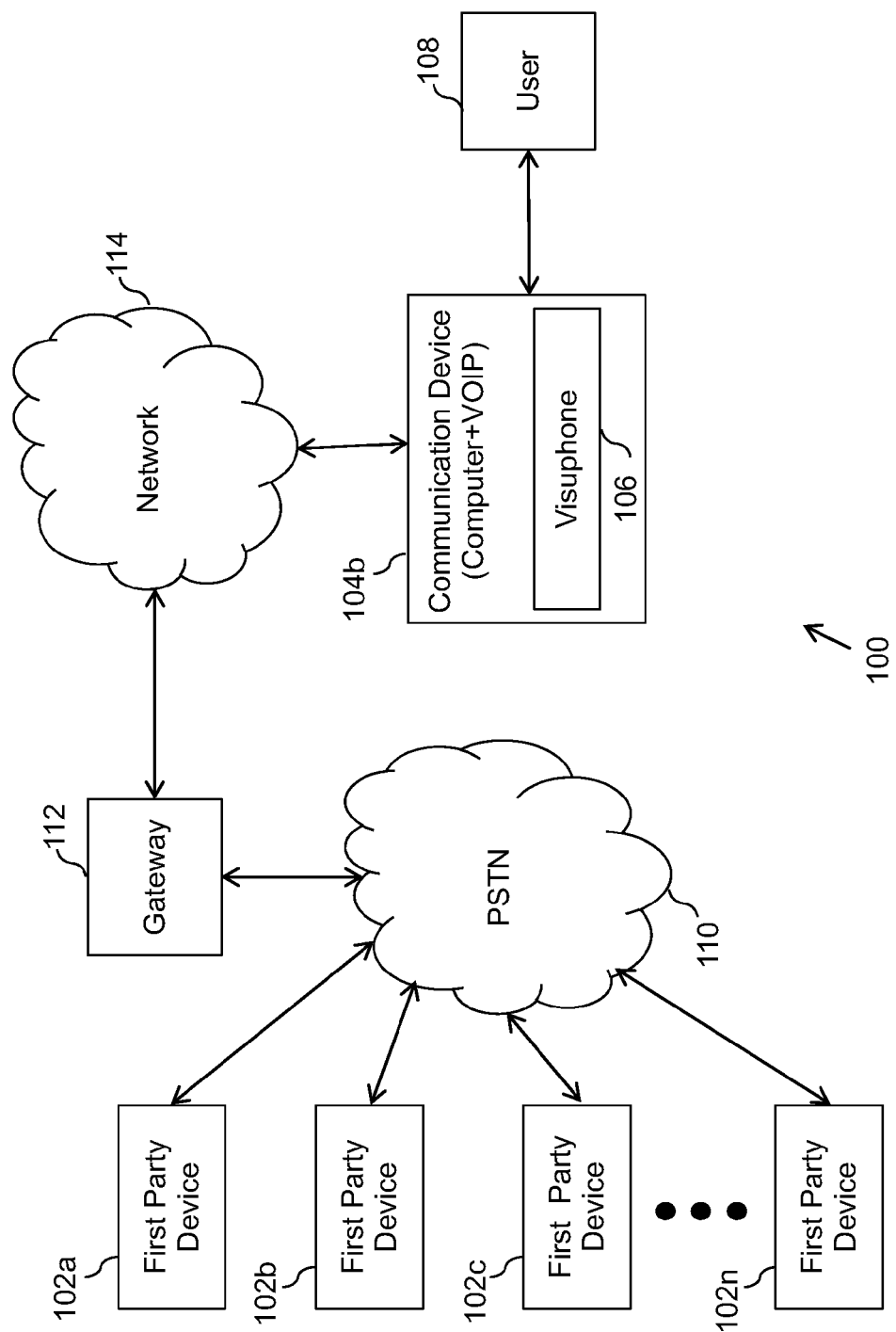
Figure 1C:
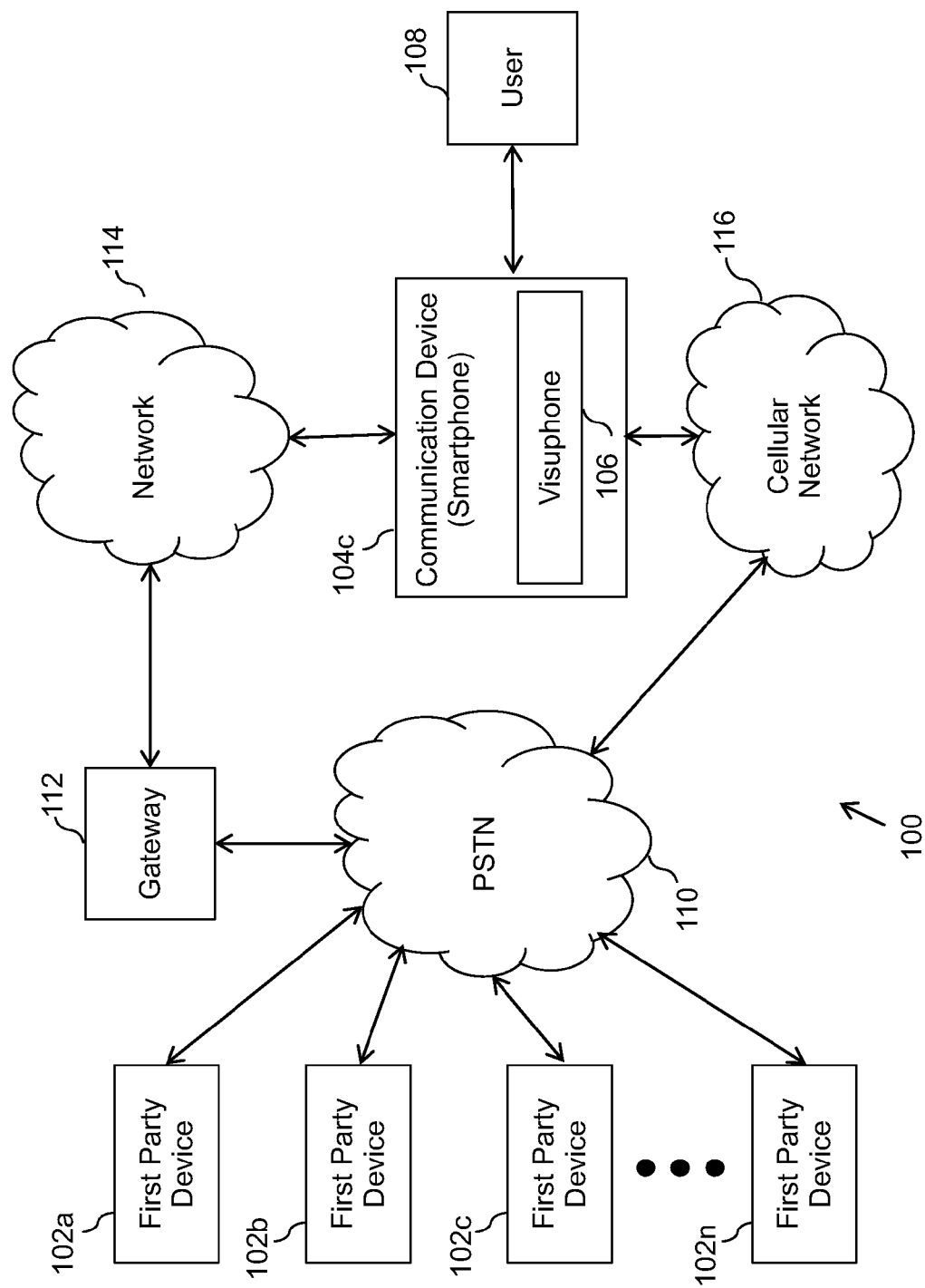
Figure 2:
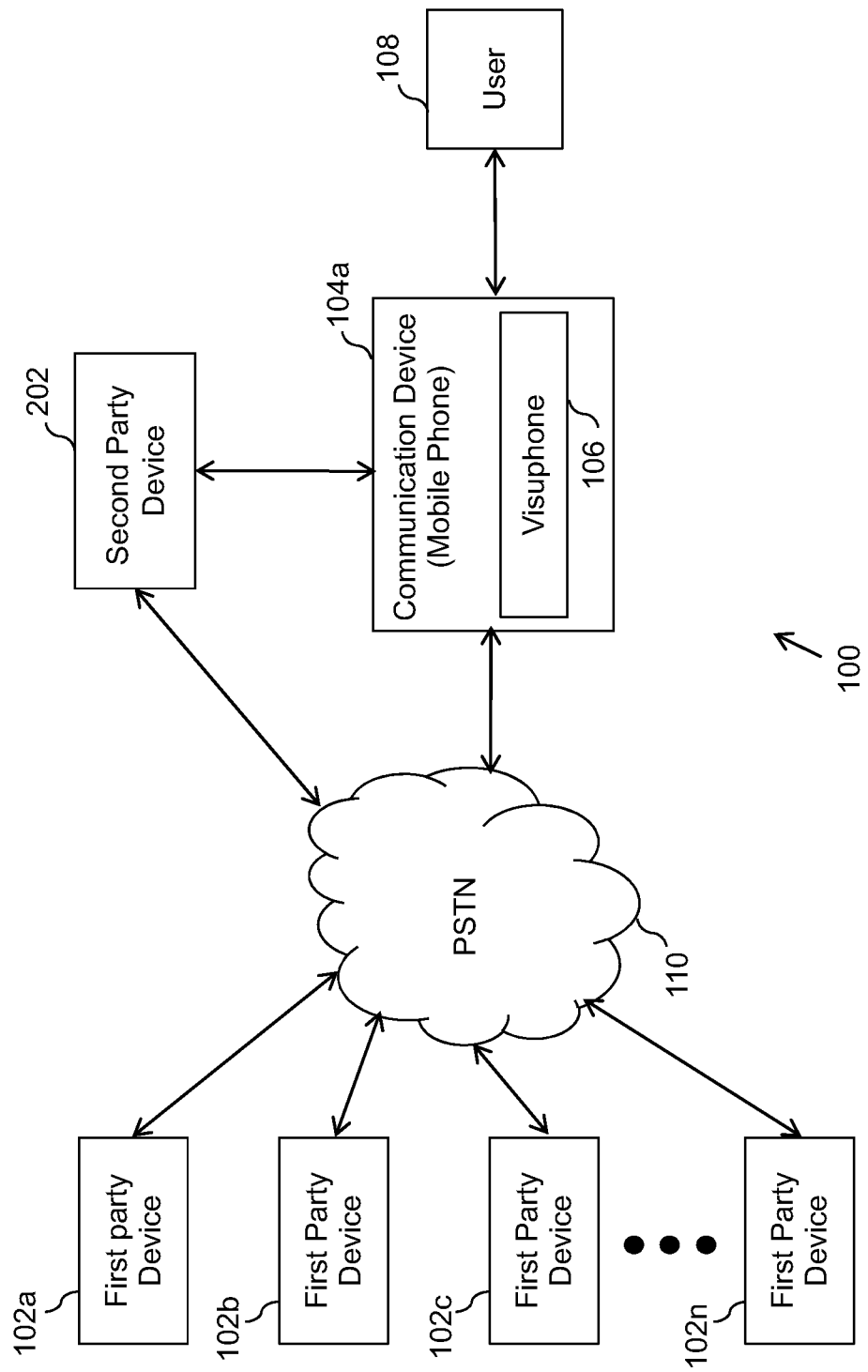
Figure 3:
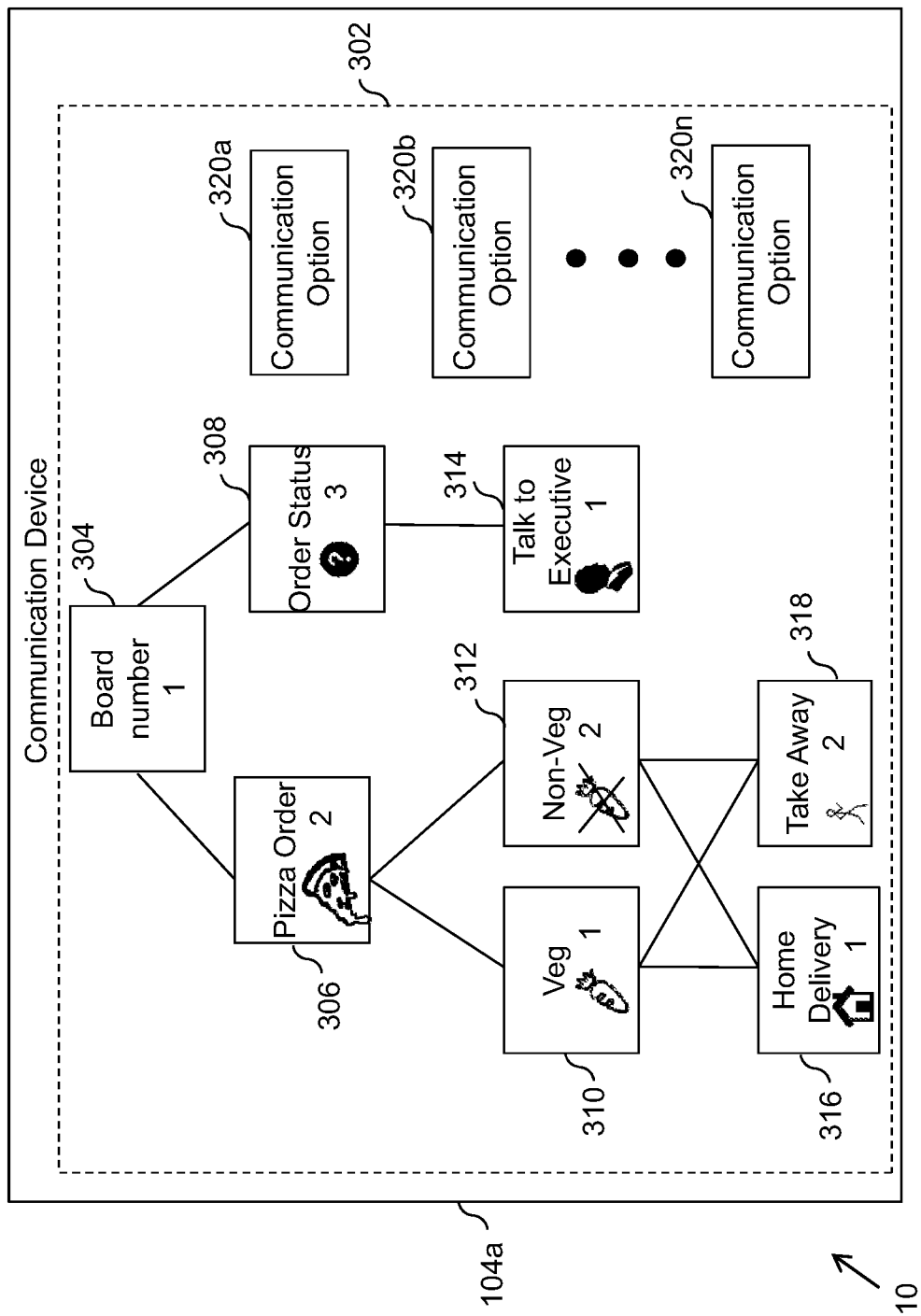
Figure 4A:
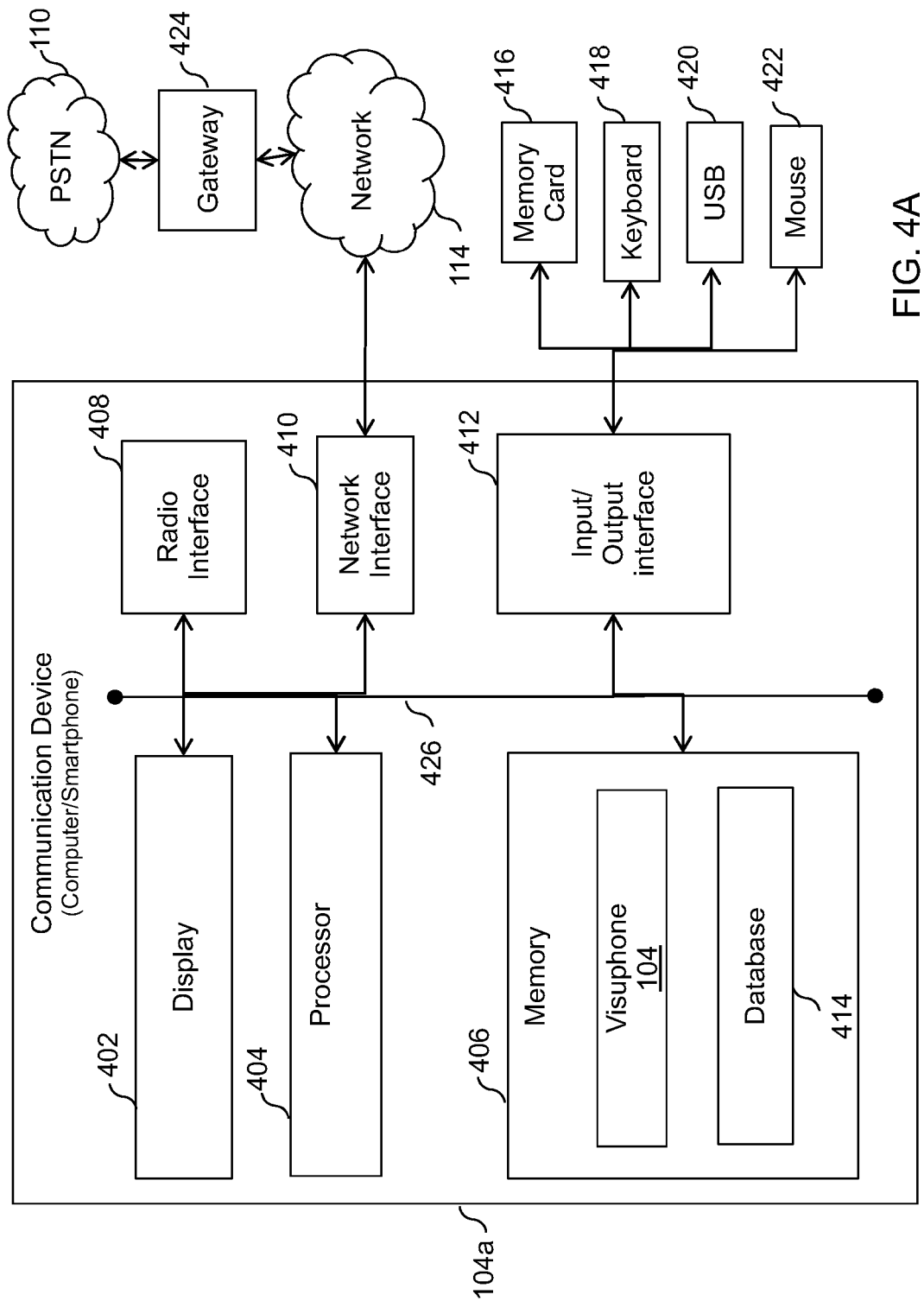
Figure 4B:
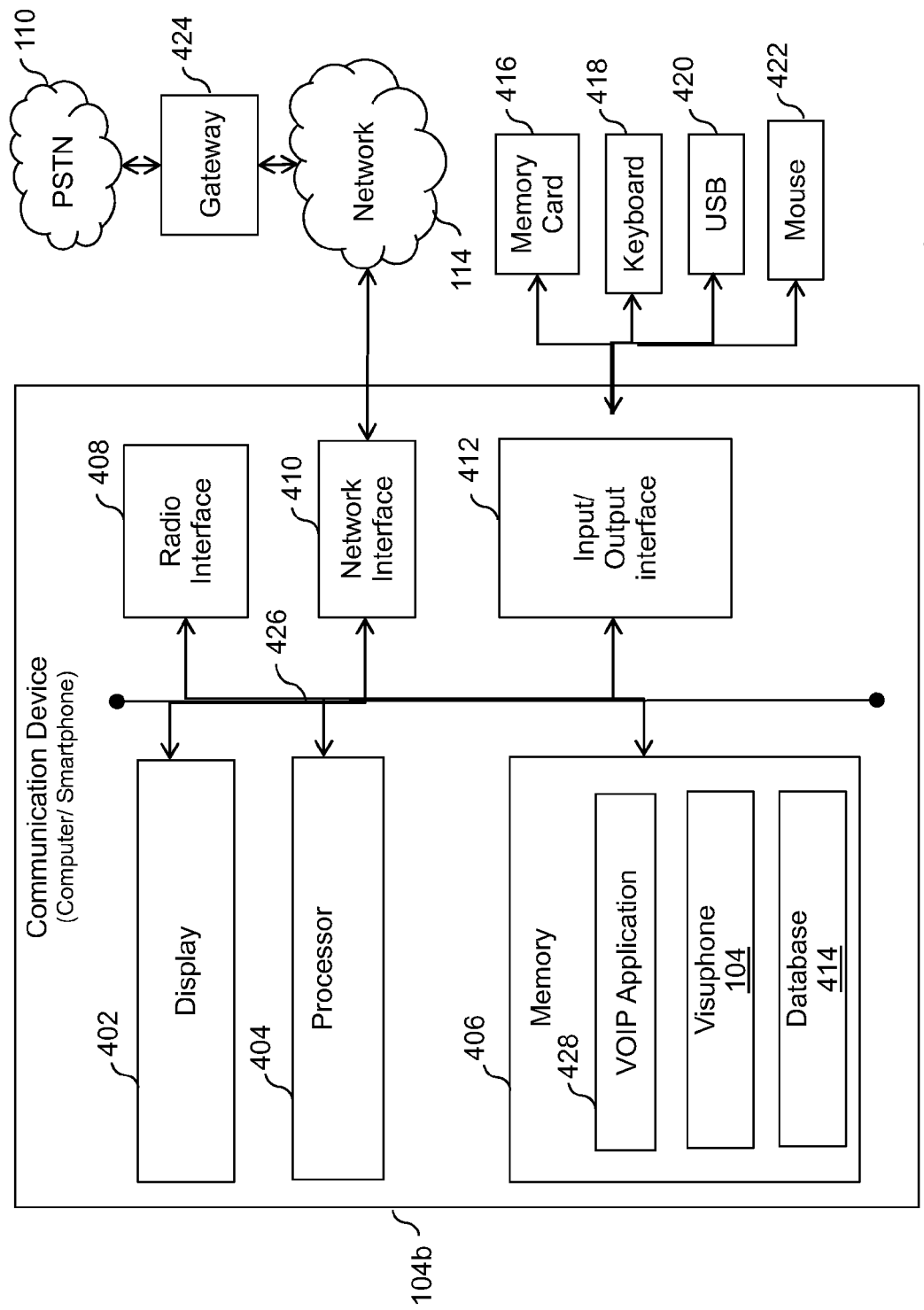
Figure 5:
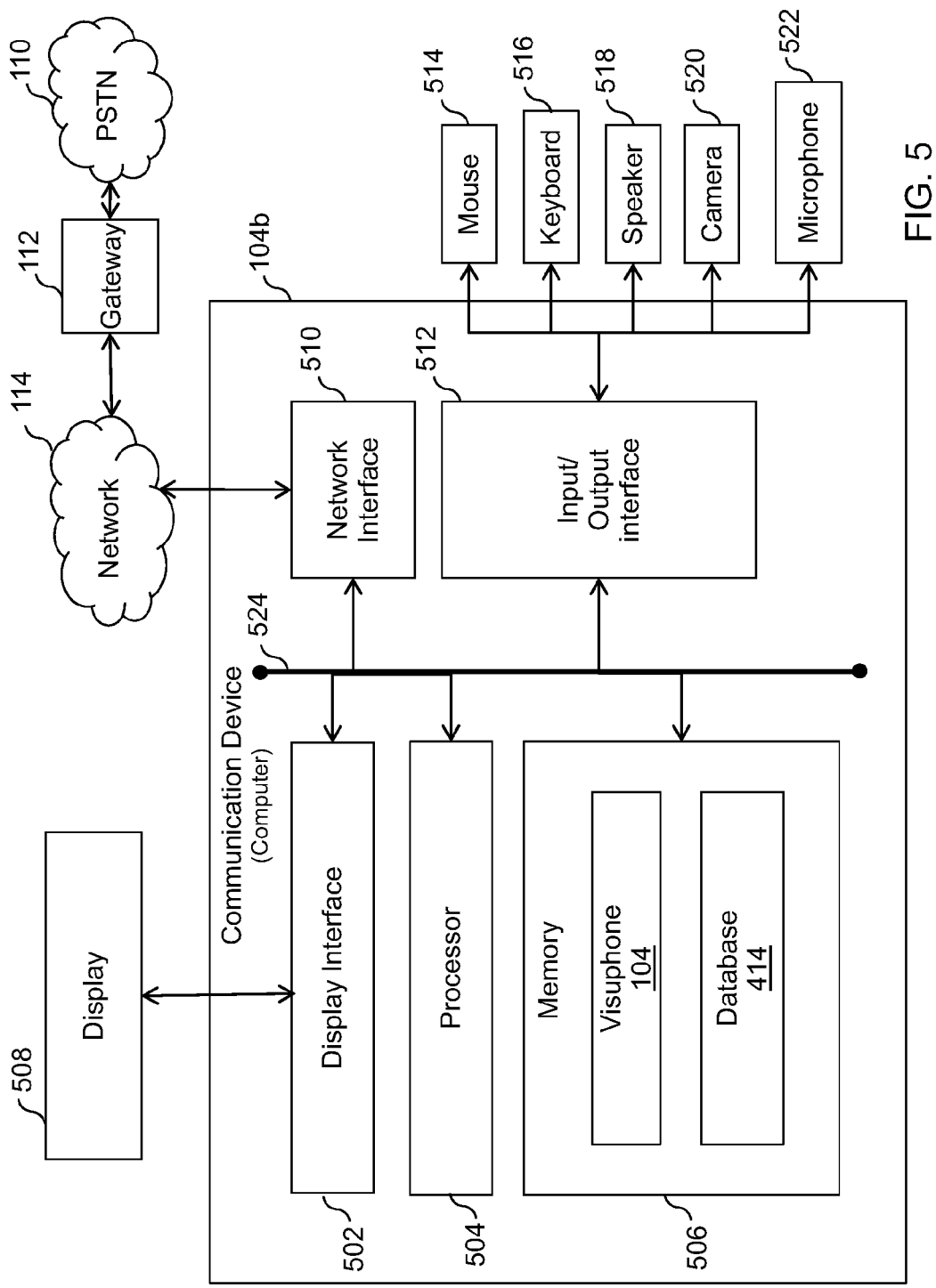
Figure 6:
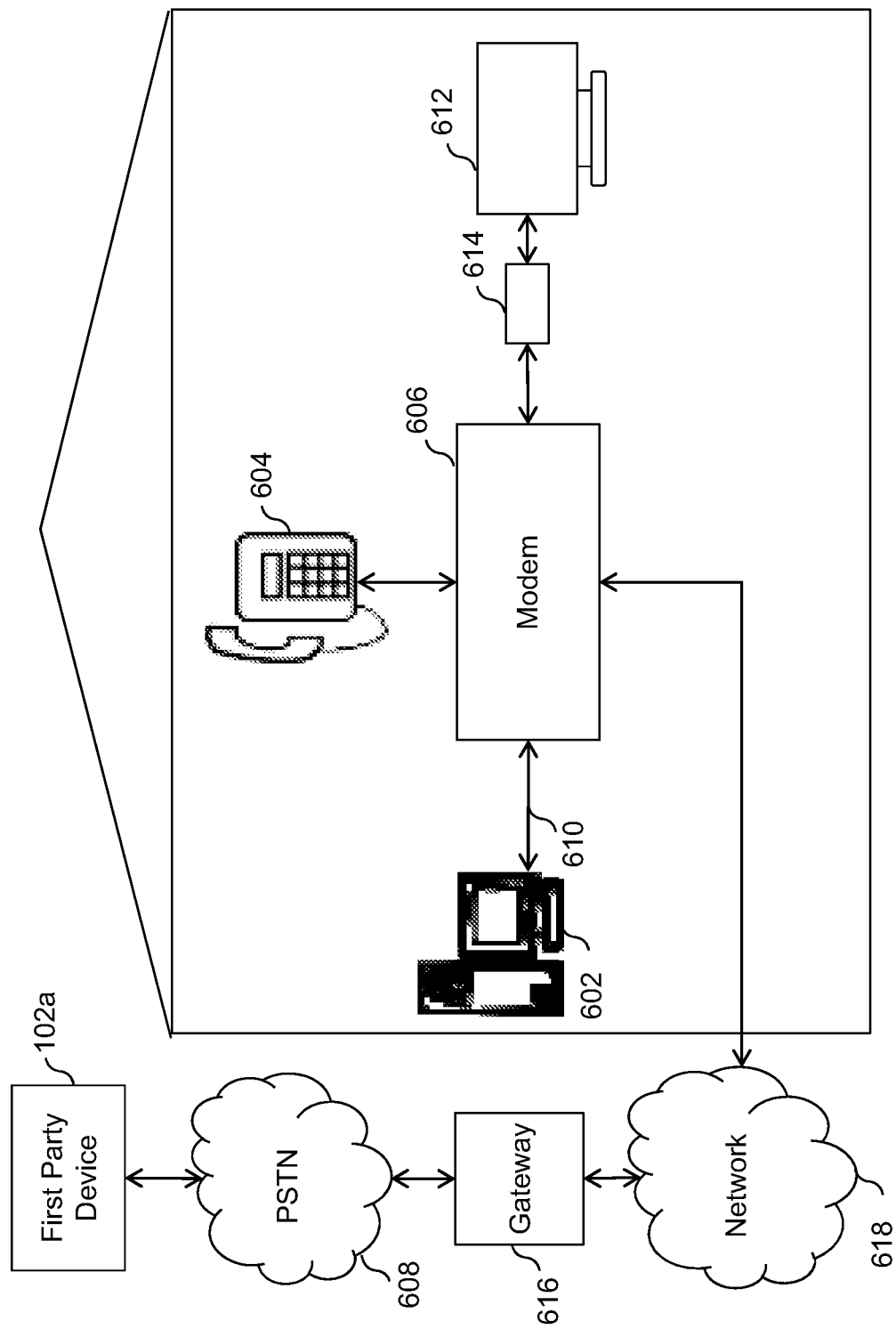
Figure 7:
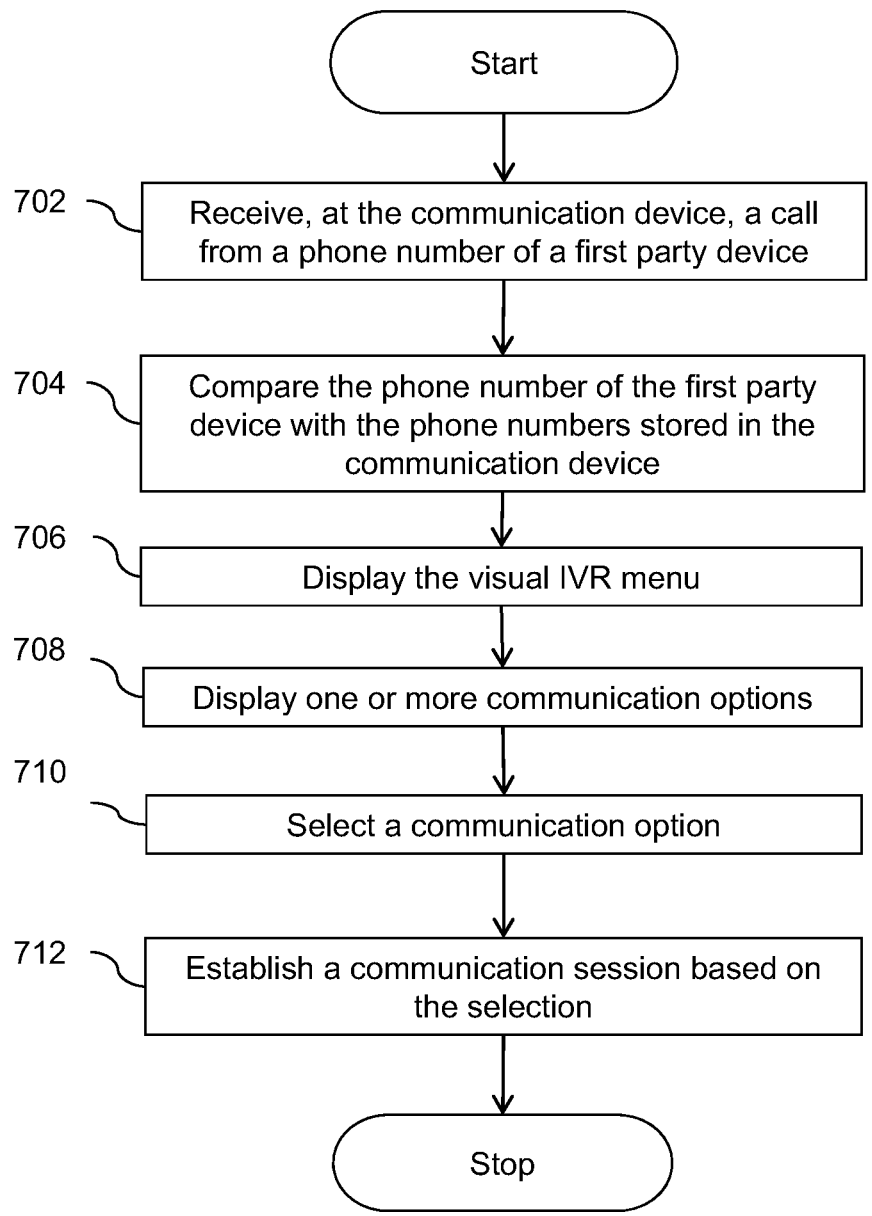

Having thus described the invention in general terms, reference will now be made to the accompanying drawings, which are not necessarily drawn to scale, and wherein:

FIG. 1A illustrates an exemplary environment where various embodiments of the invention function;

FIG. 1B illustrates another exemplary environment where various embodiments of the invention function;

FIG. 1C illustrates yet another exemplary environment where various embodiments of the invention function;

FIG. 2 illustrates yet another exemplary environment where various embodiments of the invention functions;

FIG. 3 illustrates an exemplary visual IVR menu along with one or more communication options at a communication device, in accordance with an embodiment of the invention;

FIGS. 4A and 4B illustrates exemplary components of the device for implementing a Visuphone, in accordance with an embodiment of the invention;

FIG. 5 illustrates exemplary components of the device for implementing the Visuphone, in accordance with another embodiment of the invention;

FIG. 6 illustrates the presentation of the visual IVR menu when a phone connection is associated with a wide band internet 'smart' modem; and FIG. 7 illustrates a flowchart diagram for providing enhanced telephony, in accordance with an embodiment of the invention.

DETAILED DESCRIPTION OF THE INVENTION

Illustrative embodiments of the invention now will be described more fully hereinafter with reference to the accompanying drawings, in which some, but not all embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

FIG. 1A illustrates an exemplary environment where various embodiments of the invention function. A communication network 100 may include a plurality of first party devices 102a-n. Further, the communication network 100 may include communication device 104a. A person skilled in art will appreciate, that the communication network 100 may also include more than one communication devices. Examples of the communication network 100 include, but are not limited to, the Internet, PSTN, Local Area Network (LAN), Wide Area Network (WAN), Metropolitan Area Network (MAN), and so forth. The first party devices 102a-n may initiate a call to connect to the communication device 104a. Each of the first party devices 102a-n may have associated one or more phone numbers. The first party devices 102a-n can be a device capable of data/voice communication. Examples of the first party devices 102a-n include, but are not limited to, a telephone, a computer, a laptop computer, a personal digital assistant (PDA), a mobile phone, and so forth. In an embodiment, each of the first party devices 102a-n may include one or more audio/visual Interactive Voice Response (IVR) menus. Various types of the first party devices 102a-n that implement the audible IVR menu include, for example, banks, hotels, fast-food outlets, utility services providers, corporate offices, mobile phone service providers, hospitals and so forth. Typically, the audible IVR menu provided by the first party devices 102a-n comprises audible options or instructions. In an embodiment, the visual IVR menu includes one or more text and/or graphical representation of different nodes corresponding to different nodes of the audio IVR menu.

Further, the IVR menu of a first party device such as the first party device 102a can be different from another first party device such as the first party device 102c. For example, IVR menus of a hospital may be completely different from that of a bank. Each of the first party devices 102a-n may connect to the communication device 104a by dialing a phone number associated with the communication device 104a. Further, each of the first party devices 102a-n can have more than one audio/visual IVR menus. Each of the first party devices 102a-n has an associated phone number. A user 108 may connect to a first party device of the first party devices 102a-n either by accepting a call from a first party device such as a first party device 102a or by dialing a phone number of the first party device 102a. After establishing a connection with the first party device 102a, the user 108 can interact with the first party device 102a via the IVR menu associated with the first party device 102a. Further, the first party devices 102a-n can send information to the communication device 104a. Similarly, the communication device 104a may also request information from the first party devices 102a-n. The communication device 104a can be a telecommunication device that can connect directly to a Public Switched Telephone Network (PSTN) 110. A person skilled in the art will appreciate, that the communication device 104a can also connect to a private telephone exchange. Examples of the communication device 104a include, but are not limited to, a telephone, a mobile phone, a smart phone or any other device capable of voice or data communication.

The communication device 104a includes a Visuphone 106 that may provide data regarding a phone number of the first party devices 102a-n from which the call is received at the communication device 104a. For example, the data may include geographical information or services provided by the first party devices 102a-n. Further, the Visuphone 106 may receive a call from a first party device 102a of first party devices 102a-n. In an embodiment, the Visuphone 106 may receive calls from the first party devices 102a-n. Further, the Visuphone 106 may display a visual IVR menu on the communication device 104a corresponding to the audible IVR menu based on a phone number of the first party device 102a from which the call has been received. In an embodiment, the Visuphone 106 may display the visual IVR menu at the communication device 104a even before accepting the call by the user 108. The visual IVR menu may have one or more options. Thereafter, the user 108 can select the options of the displayed visual IVR menu to obtain the required resource/information or service from the calling first party device 102a. Furthermore, the Visuphone 106 may display one or more communication options on a screen of the communication device 104a. Examples of the communication options include, but are not limited to, a conferencing option, a call forwarding option, a busy option, and so forth. The user 108 can select a communication option from the displayed one or more communication options. Based on the selection by the user a communication session may be established between the communication device 104a and the calling first party device 102a. In an embodiment, when the user 108 selects the 'conferencing' option, another communication device of the communication network 100 may be included in the call with the first party device 102a. The Visuphone 106 may be hardware, software, or a firmware implemented on the communication device 104a, or a combination thereof.

In an embodiment, the communication network 100 may include a server. The server may maintain the updated information of the first party devices 108a-n. In an embodiment of the invention, the communication device 104a can request and/or receive updates from the server. This may happen in a case when requested information is not available on the calling first party device. Further, the communication network 100 can include more than one communication devices. The communication device 104a may also request information from the first party device 102a from which the call is received.

FIG. 1B illustrates another exemplary environment where various embodiments of the invention function. As shown, a communication device 104b can be a communication device that can be connected directly to network 114. Examples of the communication device 104b include, but are not limited to, a personal computer, a laptop, a mobile phone, a smartphone, a fixed line telephone, a Voice Over Internet Protocol (VOIP) phone or other devices capable of voice or data communication. The communication device 104b may include various applications or computer programs that enable the user 108 to use the communication device 104b for receiving and/or accepting call from the first party devices 102a-n through PSTN 110 over network 114 through a gateway 112. For example, the applications may be VOIP applications, such as but not limited to, Skype, Magic Jack, Google Talk and so forth. Examples of the network 114 include any wired or wireless network, such as but not limited to, LAN, WAN, a Wi-Fi network and so forth. As discussed with reference to FIG. 1A, the first party devices 102a-n presents the audible IVR to the communication device 104b. As discussed with reference to FIG. 1A, the Visuphone 106 may receive a call from a phone number of a first party device 102a of the first party devices 102a-n. The Visuphone 106 may further display the visual IVR menu associated with the phone number of the first party device 102a, from which call is received. Further, the Visuphone 106 may display the one or more communication options such as a call forwarding option on the screen of the communication device 104b.

As shown, the communication device 104c can be connected to the PSTN 110 through the network 114 or through the cellular network 116. Various service providers provide multiple or overlapping services to customers. For example, cable television service provider may also provide phone and network service, optical network provider may also provide phone or television services, WiMax service providers that provide phone service and so forth. The network 114 may be any service provider that provides such services, for example, but not limited to, cell phone services, wireless services, network services, cable television services, or various combinations of the above or other type of services. As discussed with reference to FIG. 1A, the first party devices 102a-n includes one or more audible IVR menus. The communication device 104c includes the Visuphone 106 which displays data corresponding to phone number of the calling first party devices 102a-n. Further, Visuphone 106 may display a visual IVR menu corresponding to audible IVR menu of the phone number of the first party devices 102a-n. Moreover, the visual IVR menu is displayed when a call is received from the first party device 102 of the first party devices 102a-n. Thereafter, the user 108 may accept the call from the first party device 102 to establish a communication session with the calling first party device 102. In an embodiment of the invention, the Visuphone 106 may display one or more communication options at the communication device 104c. The user 108 may select a communication option from the displayed communication options for interacting with the calling first party device 102. In an embodiment, the Visuphone 106 may receive the visual IVR menu from the first party device 102. In an embodiment, the calling first party device 102 may request the information requested by the Visuphone 106 or the user 108, from the server of the communication network 100. Thereafter, the calling first party device 102 may send the information received from the server to the Visuphone 106. The Visuphone 106 may further request and/or receive information from the calling first party device 102. Further, the Visuphone 106 may display the information at the communication device 104c.

FIG. 2 illustrates yet another exemplary environment where various embodiments of the invention function. As discussed with reference to FIG. 1A, the communication network 100 includes the first party devices 102a-n which may initiate a call to the phone number associated with the communication device 104a. Further, the communication network 100 may include a second party device 202. In an embodiment, the communication network 100 may include a plurality of second party devices. The communication device 104a includes the Visuphone 106 that can receive the call from the first party device 102. The Visuphone 106 may further display a visual IVR menu associated with the calling first party device 102. In an embodiment, the Visuphone 106 may highlight an option or node in the visual IVR menu. The highlighted option represents the exact position of first party device 102 within the visual IVR menu from where the call is initiated. For example, in case of a bank, if a person from insurance department initiates a call to a mobile phone, then the node representing the insurance is highlighted in the visual IVR menu of the bank displayed at the mobile phone. Therefore, the user 108 can know exactly from which department within the organization the call is coming from. Accordingly, the user 108 may act or opt to attend or reject the call from the first party device 102.

Further, the Visuphone 106 may display one or more communication options on a screen of the communication device 104a. Examples of the one or more communication options can include, but are not limited to, a conferencing option, a call forwarding option, a busy option, and so forth. The user 108 may select an option from the displayed communication options. The Visuphone 106 may establish a connection with a second party device based on the selection of the communication option by the user 108. The second party device 202 may be a communication device 104, a first party device of the first party devices 102a-n, a server, and so forth depending on the selection of the communication option. The second party device 202 may have an associated phone number.

In an embodiment, when the user 108 selects a 'conferencing' option from the displayed one or more communication options then a second party device 202 may be included in the call. Now the second party device 202, the communication device 104a, and the first party device 102 from which the call was received initially may communicate through a conference call and can interact with each other. Thereafter, all three types of devices in the conference call may further request or receive information from each other. In an embodiment, the second party device 202 may be another communication device of the communication network 100. In an embodiment, the Visuphone 106 may further display a visual IVR menu associated with the second party 202. In an embodiment, the Visuphone 106 of the communication device 104a may receive the visual IVR menu associated with the phone number of the second party device 202. In an exemplary scenario, a user receives a call at a first mobile phone from an executive of the insurance department of a bank. The user 108 may select a 'conferencing' option and can include another user of a second mobile phone who might be interested in knowing about the insurance policies offered by the executive. In an embodiment, the user 108 of the communication device 104a may opt to leave the conference call in between of the call. Thereafter, the first party device 102 and second party device 202 may continue with the call.

In an embodiment, the user 108 may select a 'call forwarding' option of the displayed one or more communication options to forward the call coming from the first party device 102 to a second party 202. Thereafter, a user of the second party device 202 may interact with the first party device 102.

For example, when a user of first mobile phone receives a call from a pizzeria, then a visual IVR menu of the pizzeria can be displayed at the mobile phone along with various communication options. The user may forward the call to a second mobile phone by selecting the 'call forwarding' option. Now, the call will be between the second mobile phone and the pizzeria. In an embodiment, the second party device 202 may include a Visuphone. In another embodiment, the second party device 202 may include one or more audio and/or visual IVR menus. In an embodiment, a visual IVR menu associated with a phone number of the second party device 202 may be displayed on the communication device 104a. Further, the Visuphone 106 may receive the visual IVR menu of the second party device from the second party device 202.

FIG. 3 illustrates an exemplary visual IVR menu 302 along with one or more communication options at the communication device 104a, in accordance with an embodiment of the invention. As discussed with reference to FIGS. 1A and 2, the Visuphone 106 may display the visual IVR menu 302 associated with the phone number of the calling first party device 102 on the screen of the communication device 104a. The visual IVR menu is displayed with added graphics on the screen of the communication device 104a. The visual IVR menu 302 may include one or more options corresponding to every node in the calling first party device 102. It is well known that graphics are easier to learn and are faster to recognize than words. Therefore, graphics are used in various computerized device interfaces. Various types of graphics can be displayed for example, animated icons, icons that highlight or animate when the node is highlighted, and so forth. The graphics may be displayed for each node or a few nodes based on the usability of the visual IVR menu 302. For example, for the node 310 an icon of a vegetable may be displayed to designate a vegetarian pizza, and for the node 316 of home delivery, an icon of house may be displayed. In an embodiment of the invention, the visual IVR menu 302 can be customized to display only the text, only the icons or both. Furthermore, the user 108 can suggest or use various icons based on his preferences. The visual IVR menu is specific to the first party device 102 from which call is received.

Further, each of the first party devices 102a-n may have more than one audio IVR menus. Therefore, different visual IVR menu corresponding to the one or more audio IVR menus is possible for each of the first party devices 102a-n. In an embodiment, the communication device 104a may include more than one visual IVR menus for each first party device of the first party devices 102a-n based on the time. Therefore, different visual IVR menus corresponding to a first party device 102 might be presented to the user 108 depending on the time of dialing to the first party device 102. In an exemplary scenario, in a hotel, the food items in a daytime menu card may be different from a night menu card. Accordingly, the options in the visual IVR menu may differ. Therefore, the visual IVR menus for daytime and night can be different for the hotel. When the user 108 receives a call from the phone number of the hotel in daytime, a daytime visual IVR menu can be displayed at the communication device 104a, and if the user 108 receives a call at night, a different menu can be displayed at the communication device 104a. Therefore, a visual IVR menu of the hotel displayed at the communication device 104a for a call received at 12:30 PM may be different then the visual IVR menu displayed for another call received at 6 PM.

Further, the Visuphone 106 may display the one or more communication options 320a-n on the screen of the communication device 104a. Examples of the one or more communication options 320a-n include, but are not limited to, a conferencing option, a call forwarding option, a busy option, and so forth. In an embodiment, when the user 108 selects a 'busy' option of the communication options 320a-n, a text or audio message may be sent to the calling first party device 102. For example, when a user receives a call from a bank and selects the 'busy' option from the displayed visual IVR menu of the calling bank, then a customized or predefined message such as "I am busy right now, so please call later" can be sent to the bank. In an embodiment, the message may be an audio message.

In an embodiment, when the user 108 accepts the call from the first party device 102, a communication session is established between the communication device 104a and the first party device 102 from which the call is received. After communication establishment, the Visuphone 106 of the communication device 104a may request and/or receive information from the calling first party device 102. In an embodiment, the user 108 may include the second party device 202 by selecting 'conferencing' option from the displayed communication options 320a-n. Thereafter, the three devices i.e. the first party device 102, the communication device 104a, and the second party device 202 may have a conference call and can interact with each other. In an embodiment, the user 108 may include more than one second party device 202 in the conference call. In an embodiment, the second party 202 may include another communication device of the communication network 100 in the conference call. In another embodiment, the calling first party device such as the first party device 102a may include another first party device such as a first party device 102b in the conference call. In another embodiment, the first party device 102 from which call is received may connect the communication device 104a to another first party device 102b during the call.

FIGS. 4A and 4B illustrate exemplary components of the communication device 104a for implementing the Visuphone 106, in accordance with an embodiment of the invention. The communication device 104a includes a system bus 426 to connect the various components. Examples of system bus 426 include several types of bus structures including a memory bus, a peripheral bus, or a local bus using any of a variety of bus architectures. As discussed with reference to FIG. 1A, the communication device 104a can be a communication device such as computer, a smart-phone and so forth. The communication device 104a can connect to PSTN 110 through a gateway 424, which is connected to network 114 through a network interface 412. Input/Output (IO) interface 414 of the communication device 104a may be configured to connect external or peripheral devices such as a memory card 416, a keyboard 418, a Universal Serial Bus (USB) device 420 and a mouse 422. Although not shown, various other devices can be connected through IO interface 4104 to the communication device 104a. In an embodiment of the invention, the communication device 104a may be connected to a hub that provides various services such as voice communication, network access, television services and so forth. For example, the hub may be a Home Gateway device that acts as a hub between the home environment and the Broadband Network.

The communication device 104a includes a display 402 to output graphical information to the user 108. In an embodiment of the invention, the display 402 may include a touch sensitive screen. Therefore, the user 108 can provide inputs to the communication device 104a by touching display 402 or by point and click using the 'mouse'. Memory 406 of the communication device 104a stores various programs, data and/or instructions that can be executed by a processor 404. Examples of the memory 406 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 104a. The memory 406 may include Operating System (OS) (not shown) for the communication device 104a to function. Further, the memory 406 may include other applications that enable the user 108 to communicate/interact with the first party devices 102a-n. Examples of other applications include, but are not limited to, Skype, Google Talk, Magic Jack, and so forth. Other applications may be stored as software or firmware on the communication device 104a.

Further, the memory 406 includes the Visuphone 106 for providing a visual representation of the first party devices 102a-n. As discussed with reference to the FIG. 1A, the Visuphone 106 may be hardware, a software or a firmware stored on the communication device 104a. In an embodiment, the Visuphone 106 may be implemented as plug-in to other applications. The visual IVR menus are stored in a database 414 in memory 406 of the communication device 104a. In an embodiment, the Visuphone 106 may receive updates about visual IVR menus from the server of the communication network 100 at predefined time. The predefined time may be for example, once a week, once a month, or any other interval predefined by the user 108 or the Visuphone 106.

In an embodiment, the Visuphone 106 may display a visual IVR menu associated with the calling first party device before accepting the call by the user 108. In an embodiment, the Visuphone 106 may display one or more communication options on the display 402 of the communication device 104a. The communication option may be selected by the user 108 to include one or more second party 202 in the call.

The user 108 may input one or more key or key combinations using the keyboard 418. The keyboard 418 may be a physical keyboard or a virtual keyboard displayed on a touch screen display 402. In an embodiment, the keyboard 418 is a keypad on the communication device 104a. Subsequently, after some processing by the Visuphone 106, the visual IVR menu 302 corresponding to calling first party device phone number is searched and displayed on display 402.

In an embodiment of the invention, the visual IVR menu may be provided in real-time to user. In an embodiment of the invention, the visual IVR menu is provided by a messaging service such as a Short Messaging Service (SMS). Therefore, first party devices may provide customized visual IVR menu to the user 108. The visual IVR menu may be customized based on the profile of user. In an embodiment of the invention, the profile may be generated based on access pattern of user or the data capture by a hub connected to the communication device 104a.

The user 108 can interact with the visual IVR menu by pressing a desired button from the keyboard 418. For example, the user 108 can press a '3' key from the keyboard 418 to select a node 3 in the visual IVR menu 302. Further, the user 108 can directly select the node 3 of the visual IVR menu 302 from the display 402, in case of a touch sensitive screen. Depending on the complexity or size of first party devices, visual IVR menu 302 may have various nodes. Moreover, display area of the display 402 may be limited or small. As a result, all the nodes of the visual IVR menu 302 may not be displayed together on the display 402. In such a case, the Visuphone 106 is configured to allow the user 108 to navigate by scrolling horizontally and/or vertically to view nodes on the visual IVR menu 302. Further, the Visuphone 106 may detect the capability of the communication device 104a before displaying the visual IVR menu 302. For example, in case the communication device 104a is a basic mobile phone with limited functionality of the display screen. Therefore, the Visuphone 106 may display the visual IVR menu in form of a simple list. Similarly, a list may be displayed in case of fixed line or wired telephones. Moreover, in case the communication device 104a includes a high capability screen, such as but not limited to an iPhone, then the visual IVR menu is displayed in form of graphics. Subsequently, after the user 108 selects a desired option or communication option from the visual IVR menu 302, a connection is established between the communication device 104a and the calling first party device. In one embodiment, the Visuphone 106 is configured to detect and present an application or computer program available on the communication device 104a.

In an embodiment, the user 108 may dial a phone number from a VOIP application 428 on the communication device 104b, as shown with reference to FIG. 4A. The phone number may correspond to any of first party device from the first party devices 102a-n. In an embodiment, the user 108 selects a pre-stored phone number from the VOIP application 428. As discussed with reference to FIG. 2, the representation of the visual IVR menu 302 and the one or more communication option 320a-n can be provided on the display 402. Subsequently, after detecting selection from the user 108, the second party device 202 may be included in the call depending on the selection of the communication option.

In an embodiment, the Visuphone 106 may include a VOIP plug-in that monitors the incoming/outgoing calls to/from the VOIP application. Therefore, the VOIP plug-in may search each calling phone number of the first party device 102 in the database 414. In case, the calling phone number is found in the database 414 and is associated with an audible IVR, then the VOIP plug-in may display the visual IVR menu corresponding to the audible IVR menu of the calling first party device phone number. In an embodiment, when the database does not include a match for the calling phone number of the first party device, then the communication device 104a may request and/or receive the a visual IVR menu associated with the phone number from the first party device 102.

FIG. 5 illustrates exemplary components of the communication device 104b for implementing the Visuphone 106, in accordance with another embodiment of the invention. The communication device 104b includes a system bus 524 to connect the various components. Examples of the system bus 524 include, but are not limited to, a memory bus or memory controller, a peripheral bus, or a local bus using any of a variety of bus architectures. As discussed with reference to FIG. 1B, the communication device 104b can be a computing device such as, but not limited to, a personal computer, a laptop, a mobile phone, a smart-phone, and so forth. The communication device 104b can connect to the network 114 through a network interface 510. Further, the communication device 104b can connect to the PSTN 110 through the gateway 112 and the network 114 through the network interface 510. An Input/Output (IO) interface 512 of the communication device 104b may be configured to connect external or peripheral devices such as a mouse 514, a keyboard 516, a speaker 518, a camera 520, and a microphone 522. Although not shown, various other devices such as a hard disk, a Universal Serial Bus (USB) device or others can be connected through the IO interface 512 to the communication device 104b. A person skilled the art will appreciate that although not described, various other types of devices capable of voice and/or data communication can be connected to the communication device 104b.

The communication device 104b includes a display interface 502 to connect to a display 508. The display interface 502 can be for example, a video adapter. The display 508 outputs graphical information to the user 108. In an embodiment of the invention, the display 508 includes a touch sensitive screen. Therefore, the user 108 can provide inputs to the communication device 104*b* by touching display 508 or by scrolling and pointing with the mouse 514 and a click. A memory 506 of the communication device 104*b* may store various programs, data and/or instructions that can be executed by a processor 504. Examples of the memory 506 include, but are not limited to, a Random Access Memory (RAM), a Read Only Memory (ROM), a hard disk, and so forth. A person skilled in the art will appreciate that other types of computer-readable media which can store data that is accessible by a computer, such as magnetic cassettes, flash memory cards, digital video disks, and the like, may also be used by the communication device 104*b*. The memory 506 may include Operating System (OS) (not shown) for the communication device 104*b* to function. Further, the memory 506 may include other applications that enable user 108 to communicate/interact with the first party devices 102*a-n*. Examples of other applications include, but are not limited to, Skype, Google Talk, Magic Jack, and so forth. Other applications may be software or firmware stored on the communication device 104*b*.

Further, the memory 506 may include the Visuphone 106 for receiving a call from the first party devices 102*a-n*. Further, the Visuphone 106 is capable of presenting the visual IVR menu 302 corresponding to the audible IVR menu of a calling first party device 102 as discussed with reference to FIG. 3. Furthermore, the Visuphone 106 may display one or more communication options 320*a-n* on the display 508 of the communication device 104*b*. The Visuphone 106 may further request and/or receive information from the calling first party device 102 after establishing a communication session. The Visuphone 106 may be an application stored as a software or firmware on the communication device 104*b*. The Visuphone 106 may establish the communication session with the calling first party device 102 when the user 108 accepts the call. Further, the Visuphone 106 may include one or more second party 202 in a conference call by selecting a 'conferencing' option of the communication options 320*a-n*. The memory 506 further includes a database 414 for storing visual IVR menus associated with each of plurality of first party devices 102*a-n*. As discussed in FIGS. 4A and 4B, the phone numbers associated with the first party devices 102*a-n* are stored in the database 414 in memory 506 of the communication device 104*b*.

Depending on the complexity or size of the first party devices, the visual IVR menu 302 may have various nodes. For example, an organization with 50 departments may have more menu options or nodes than that of an organization with 10 departments. Further, the display area of display 508 may be limited. As a result, all the nodes of the visual IVR menu 302 may not be displayed together on display 508. In such a case, the Visuphone 106 is configured to allow the user 108 to navigate by scrolling horizontally and/or vertically to view nodes on the visual IVR menu 302. Moreover, the user 108 can search for a desired option from the visual IVR menu 302. Subsequently, after the user 108 selects a desired option from the visual IVR menu 302, a connection is established between the communication device 104*b* and the calling first party device 102 based on the selected option from the visual IVR menu 302.

Another embodiment of the invention allows the user to select one or more options of the visual IVR menu 302 using car display like GPS display. Hands-free cell phone system is used in many cars as a separate device or as an integrated system in the car. These devices allow the user to talk with the cell phone without holding the cell phone in his hands. Some devices are using the car speakers for the phone call. In many cases, the hands-free system can use a display screen in the car like GPS screen or other display. Following voice menu while driving might not be the optimal way to use hands-free cell phone system. In some cases, selecting an option from a visual IVR menu 302 is preferred. While driving or stopping in red light, it might be easier to use larger display like the GPS display in the car. The display can present the visual IVR menu when the first party devices 102*a-n* calls the communication device 104*a* and the user can select the option from the visual IVR menu 302. The computing engine to support the visual IVR menu 302 could be embedded in the car GPS system or in another controller that have access to the car display. Once the system recognizes a first party device 102 of the call to be an IVR supported device then it will access the database, and pull out the representation of one or more first party devices and display. Accordingly all the other features of the Visuphone 106 could be incorporated.

Another embodiment of the invention allow visual IVR menu for calls made from a conventional home telephone. FIG. 6 illustrates the presentation of the visual IVR menu when a phone connection is associated with a wide band internet 'smart' modem, in an embodiment of the invention. A phone 604 connected to a Public Switched Telephone Network (PSTN) 608 and through a gateway 616 to the Internet network 618 is shown in FIG. 6. A first party device 102*a* can call a phone number of the phone 604. The network 618 may be any service provider that provides services, for example, but not limited to, telephone services, cell phone services, wireless services, Internet services, cable television services, or various combinations of the above or other type of services. An embodiment of the invention allow visual IVR menu for calls received at a conventional home telephone.

Further, the connection to the network 618 is associated with a wide band Internet 'smart' modem 606. The phone 604 may be a regular phone, such as a landline phone or a cordless landline phone. The modem 606 may be a Digital Subscriber Link (DSL) modem or a cable modem that connects the home device to the Internet and/or computer network. The modem 606 is connected to a service provider, and can provide the home devices with telephone, Internet and television services. The modem 606 may provide both wired and wireless connections. As shown with reference to FIG. 6, the modem 606 provides the home with the Internet through wire 610 to a computer 602, or through a Wi-Fi connection. The modem 606 comprises the ability to detect and recognize the calls received by the phone 604. The phone numbers received by the phone 604 to establish connection are then compared with phone numbers stored in a database, such as visual IVR menu database 414. Therefore, in case the calling phone number corresponds to the first party device 102*a* with an audible IVR menu, and also when associated visual IVR menu exists then, the modem 606 may provide the visual IVR menu on the computer 602 connected to it. Moreover, the modem 606 may use private web sites to present the visual IVR menu or just provide the phone number of the calling first party device 102*a* to the computer 602. Thereafter, a software tool on the computer 602 may present the visual IVR menu on the screen of the computer 602.

Once the communication session is established between the first party device 102*a* and the phone 604, the 'smart' modem 606 will continue to monitor the numbers dialed or received by phone 604 to browse or advance the visual IVR menu accordingly. Furthermore, the numbers dialed or received may be stored for future processing such as highlighting previous selections in the visual IVR menu, providing customized visual IVR menu and so forth. The visual IVR menu system comprising computer 602 and Modem 606 may incorporate additional enhancements as presented before.

In another embodiment of the invention, a house television 612 may be used to present the visual IVR menu. In various houses modem 606 decodes television signals and transfers it to a set-top box 614 that provides signals to television 612. The visual IVR menu may be presented on a channel dedicated for IVR. Therefore, when phone 604 is used to receive a call, modem 606 can detect it and present the visual IVR menu corresponding to the phone number of the calling first party device 102*a* on the designated channel of the television 612. The modem 606 may further display one or more communication options 320*a-n* on the designated channel of the television 612. Further, all the options described before can be provided now using the screen of the television 612 for the visual IVR menu. The caller selection can be done by using the simple phone 604 or alternatively using the TV 612, the set top box 614 remote control. Further, television 612 screen may be used to present the visual IVR menu in a few alternatives ways. For example, a device provided by a company named RokuInc., allows streaming of content from the Internet to television. Most set-top boxes now have an Internet connection or telephone connections. Furthermore, various devices such as some Digital Versatile Disc (DVD) players, and video game players or controllers such as Xbox or Playstation, can be connected to the Internet. Each of those devices may allow the 'smart' modem 606 to provide a visual IVR menu and/or the one or more communication options 320*a-n* on the screens of the television 612.

FIG. 7 illustrates a flowchart diagram for providing enhanced telephony, in accordance with an embodiment of the invention. The first party devices 102*a-n* may call a phone number of the communication device 104. The communication device 104 may receive a call from the phone number of the first party devices 102*a-n*. The user 108 may use the communication device 104 to connect or interact with the first party devices 102*a-n* and/or second party device 202. The first party devices 102*a-n* may include an audible IVR menu for interaction with the user 108. Further, the communication device 104 may include the Visuphone 106 to display a visual IVR menu 302 associated with a phone number of a first party device 102 from which a call is received. The Visuphone 106 may further display the one or more communication options 320*a-n* at the communication device 104, as discussed with reference to the FIG. 3. The Visuphone 106 may establish a communication session with the phone number of the calling first party device 102 by accepting the call. In an exemplary scenario, a user of the mobile phone receives a call from a bank, then 'conferencing' and 'call forwarding' options may also be displayed along with the visual IVR menu of the bank on the mobile phone. The user may select a 'conferencing' option to include another mobile device in the conference call. Similarly, the user may select the 'call forwarding' option to forward the call to another communication device or a server in the communication network 100.

At step 702, a call from a phone number of a first party device 102 such as a first party device 102*a*, is received. The call may be received by the Visuphone 106 of the communication device 104. The first party device 102*a* may initiate a call to the communication device 104 by dialing a phone number of the communication device 104. At step 704, the phone number of the first party device 102*a* is compared with a plurality of phone numbers stored at the communication device 104. The Visuphone 106 may compare the phone number of the first party device 102*a* with the stored phone numbers. As discussed with reference to FIG. 4A, the database 414 may store the one or more phone numbers of the first party devices 102*a-n*. Further, the database 414 stores one or more visual IVR menus associated with the phone numbers of the first party devices 102*a-n*. In an embodiment, it may be checked whether a visual IVR menu associated with the phone number of the calling first party device 102*a* is present in the database 414 of the communication device 104. If the visual IVR menu is not present, the communication device 104 may receive the visual IVR menu associated with the first party device 102*a* from the first party device 102*a*. In an embodiment, the visual IVR menu associated with the first party device 102*a* may be received from the server.

At step 706, the visual IVR menu 302 associated with the calling first party device 102*a* is displayed. The visual IVR menu 302 may be displayed at the display 402 of the communication device 104, as shown in FIG. 4A. The visual IVR menu includes one or more graphics and/or text options corresponding to different nodes as shown in FIG. 3. At step 708, one or more communication options 320*a-n* is displayed. The one or more communication options 320*a-n* may be displayed at the display 402 of the communication device 104. Examples of the one or more communication options 320*a-n* include, but are not limited to, a conferencing option, a call forwarding option, a busy option, and so forth. At step 710, the user 108 of the communication device 104 may select a communication option of the displayed one or more communication options 320*a-n*. At step 712, a communication session is established based on the selection by the user 108. In an embodiment, the user 108 may select the 'conferencing' option, to establish the communication session between the first party device 102*a*, the communication device 104 and the second party device 202. Thereafter, all the three devices can communicate/interact with each other and may request/receive information from each other. In another embodiment, the user 108 may forward the call of the first party device 102*a* to another communication device of the communication network 100 by selecting the 'call forwarding' option. In an embodiment, the call may be forwarded to a server of the communication network 100. In another embodiment, the user 108 may select the 'busy' option when the user 108 cannot attend the call. Selecting the 'busy' option by the user may send a predefined audio/text message to the calling first party device 102*a*.

In another embodiment of the invention, a method is disclosed for displaying a visual IVR menu associated with a phone number of a first party device from which a call is received, at the communication device.

In an embodiment of the invention, more than one visual IVR menus associated with the phone numbers of the first party devices may be displayed at a communication device. In an embodiment, the Visuphone may display the one or more visual IVR menus at the communication device. In another embodiment of the invention, the user may request information from more than one first party device simultaneously. The user may interact with more than one visual IVR menus associated with different first party devices. In an embodiment, the one or more visual IVR menus may be associated with the second party device. For example: a user receives a call from an insurance department of a bank offering some insurance policy to the user. When the user accepts the call a visual IVR menu associated with the bank with the insurance department highlighted is displayed on the screen of the communication device. During the call, if the user wish to check his/her account balance to take a decision regarding insurance policies. The user may check his/her account balance by selecting the personal banking option from the visual IVR menu of the bank. As soon as the user selects this option another visual IVR menu of the personal banking will be displayed on the screen of the communication device. Thereafter, the user may simultaneously interact with both the visual IVR menus.

In an embodiment of the invention, the user may request information from more than one first party device simultaneously. The user may interact with more than one visual IVR menus associated with different first party devices. For example: a user gets a call from an restaurant offering different types of cuisine. When the user accepts the call a visual IVR menu associated with the restaurant is displayed at the screen of the communication device. During the call, if the user wishes to check menus of two or more cuisines, the user may select from the main visual IVR menu of the restaurant. Based on the selection by the user, the two or more visual IVR menus may be displayed at the communication device. Thereafter, the user may simultaneously interact with the displayed visual IVR menus.

An aspect of the invention is to provide the visual IVR menu when the call is forwarded from one first party device to another.

Another aspect of the invention is to provide visual IVR menus on receiving a call from the first party device on electronic devices with screens that are connected to Visuphone.

Yet another aspect of the invention is that the user may involve other one or more users or communication devices in a call from a first party device. Thereafter, the user, the another user may interact with the first party device in a conference call. In an embodiment, the user may leave the conference call in between the call.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Embodiments of the invention are described above with reference to block diagrams and schematic illustrations of methods and systems according to embodiments of the invention. It will be understood that each block of the diagrams and combinations of blocks in the diagrams can be implemented by computer program instructions. These computer program instructions may be loaded onto one or more general purpose computers, special purpose computers, or other programmable data processing translator to produce machines, such that the instructions which execute on the computers or other programmable data processing translator create means for implementing the functions specified in the block or blocks. Such computer program instructions may also be stored in a computer-readable memory that can direct a computer or other programmable data processing apparatus to function in a particular manner, such that the instructions stored in the computer-readable memory produce an article of manufacture including instruction means that implement the function specified in the block or blocks.

While the invention has been described in connection with what is presently considered to be the most practical and various embodiments, it is to be understood that the invention is not to be limited to the disclosed embodiments, but on the contrary, is intended to cover various modifications and equivalent arrangements included within the spirit and scope of the appended claims. The invention has been described in the general context of computing devices, phone and computer-executable instructions, such as program modules, being executed by a computer. Generally, program modules include routines, programs, characters, components, data structures, etc., that perform particular tasks or implement particular abstract data types. A person skilled in the art will appreciate that the invention may be practiced with other computer system configurations, including hand-held devices, multiprocessor systems, microprocessor-based or programmable consumer electronics, network PCs, minicomputers, mainframe computers, and the like. Further, the invention may also be practiced in distributed computing worlds where tasks are performed by remote processing devices that are linked through a communications network. In a distributed computing world, program modules may be located in both local and remote memory storage devices.

This written description uses examples to disclose the invention, including the best mode, and also to enable any person skilled in the art to practice the invention, including making and using any devices or systems and performing any incorporated methods. The patentable scope the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A communication device comprising:
   (a.) a processor; and
   (b.) a memory coupled to said processor, said memory comprising:
      instructions executable by the processor for allowing access to a database comprising one or more visual Interactive Voice Response (IVR) menus associated with each of a plurality of phone numbers of one or more first party devices;
      means for receiving a call from a first party device from the one or more first party devices;
      means for comparing a phone number of the calling first party device with the plurality of phone numbers stored in the database, and retrieving from the database a visual IVR menu associated with the phone number of the calling first party device; and
      means for displaying the retrieved visual IVR menu.

2. The communication device of claim 1 further comprising:
   means for displaying one or more communication options;
   means for selecting, by a user, a communication option from the displayed one or more communication options; and
   means for establishing a communication session with at least one second party device based on the selection.

3. The communication device of claim 2 further comprising means for receiving, from the calling first party device, the visual IVR menu associated with the phone number of the calling first party device.

4. The communication device of claim 2, wherein the second party device is a first party device.

5. A communication device comprising:
   a processor; and
   a memory coupled to the processor, the memory comprising:
      (a.) a database comprising one or more visual Interactive Voice Response (IVR) menus associated with each of a plurality of phone numbers of one or more first party devices;
      (b.) instructions executable by the processor for receiving a call from a first party device from the one or more first party devices;
      (c.) instructions executable by the processor for comparing a phone number of said first party device with phone numbers stored in the database, and retrieving from the database a visual IVR menu associated with the phone number of the first party device; and
      (d.) instructions executable by the processor for sending to be displayed, said visual IVR menu.

6. The communication device of claim 5, wherein the memory further comprises instructions executable by the processor for:
   displaying, at the communication device, one or more communication options;
   selecting, by a user, a communication option from the displayed one or more communication options; and
   establishing a communication session with at least one second party device based on the selection.

7. The communication device of claim 6, wherein the one or more communication options comprises a conferencing option for connecting the at least one second party device to the communication session.

8. The communication device of claim 7, wherein the one or more communication options further comprises a call forwarding option for directing the call of the first party device phone number to the at least one second party device.

9. The communication device of claim 6, wherein the memory further comprises instructions executable by the processor for displaying the visual IVR menu associated with the phone number of the second party device.

10. The communication device of claim 5, wherein the memory further comprises instructions executable by the processor for receiving, from the first party device, the visual IVR menu associated with the phone number of the first party device.

11. A method for providing enhanced telephony using communication device, the communication device comprising a processor and a memory coupled to the processor, the method comprising:
   receiving, at the communication device, a call from a first party device having first party phone number, the memory of the communication device comprises one or more visual Interactive Visual Response (IVR) menus associated with each of a plurality of phone numbers of first party devices; and
   in response to receiving the call from the first party device, comparing said first party phone number using said processor with said one or more visual Interactive Visual Response (IVR) menus, and providing to be displayed a visual IVR menu associated with said first party phone number.

12. The method of claim 11 further comprising:
   displaying, at the communication device, one or more communication options;
   selecting, by a user, a communication option from the displayed one or more communication options; and
   establishing a communication session with at least one second party device based on the selection.

13. The method of claim 12, wherein the one or more communication options comprises a conferencing option for connecting the at least one second party device to the communication session.

14. The method of claim 13, wherein the one or more communication options further comprises a call forwarding option for directing the call of the first party device phone number to the at least one second party device.

15. The method of claim 12 further comprising receiving, at the communication device, a visual IVR menu associated with a phone number of the second party device.

16. The method of claim 15 further comprises displaying the visual IVR menu associated with the phone number of the second party device.

17. The communication device of claim 11 further comprising receiving, from the first party device, the visual IVR menu associated with the phone number of the first party device.

18. A Non transitory tangible computer readable medium comprising instructions for the execution according to claim 11.

* * * * *